(12) United States Patent
Willemsen et al.

(10) Patent No.: US 12,458,690 B2
(45) Date of Patent: Nov. 4, 2025

(54) AFRICAN SWINE FEVER VIRUS VACCINE

(71) Applicant: Stichting Wageningen Research, Wageningen (NL)

(72) Inventors: Petrus Theodorus Johannes Willemsen, Amsterdam (NL); Bernardus Petrus Hubertus Peeters, Lelystad (NL)

(73) Assignee: STICHTING WAGENINGEN RESEARCH, Wageningen (NL)

( * ) Notice: Subject to any disclaimer, the term of this patent is extended or adjusted under 35 U.S.C. 154(b) by 581 days.

(21) Appl. No.: 17/276,790

(22) PCT Filed: Sep. 18, 2019

(86) PCT No.: PCT/NL2019/050614
§ 371 (c)(1),
(2) Date: Mar. 16, 2021

(87) PCT Pub. No.: WO2020/060403
PCT Pub. Date: Mar. 26, 2020

(65) Prior Publication Data
US 2022/0047694 A1 Feb. 17, 2022

(30) Foreign Application Priority Data

Sep. 18, 2018 (EP) .................................. 18195280
Mar. 27, 2019 (CN) ........................ 201910239547.X

(51) Int. Cl.
*A61K 39/187* (2006.01)
*C12N 7/00* (2006.01)
*A61K 39/00* (2006.01)

(52) U.S. Cl.
CPC .............. *A61K 39/187* (2013.01); *C12N 7/00* (2013.01); *A61K 2039/5258* (2013.01);
(Continued)

(58) Field of Classification Search
None
See application file for complete search history.

(56) References Cited

U.S. PATENT DOCUMENTS

2022/0047694 A1*  2/2022  Willemsen ........... A61K 39/187

FOREIGN PATENT DOCUMENTS

| CN | 101825633 A | 9/2010 |
|---|---|---|
| CN | 101991848 A | 3/2011 |
| WO | 2009008888 A1 | 1/2009 |
| WO | 2011110953 A2 | 9/2011 |

OTHER PUBLICATIONS

Weesendorp et al. ("Use of in silico prediction models to predict T-cell epitopes for the development of vaccines against African swine fever virus." (2015): 57-58).*

(Continued)

*Primary Examiner* — Shanon A. Foley
(74) *Attorney, Agent, or Firm* — Wood, Phillips, Katz, Clark & Mortimer

(57) ABSTRACT

The invention is directed to a recombinant nucleic acid molecule comprising an expression cassette encoding a polyepitope comprising T-cell antigens from proteins of African Swine Fever Virus. The invention further relates to a viral particle, comprising said recombinant nucleic acid molecule, and to a viral particle comprising B-cell antigens of African Swine Fever Virus. The invention further relates to methods of stimulating an immune response in a pig comprising administering the recombinant molecule of the invention, and/or the viral particle of the invention, to the pig in an amount effective to induce an immune response.

14 Claims, 11 Drawing Sheets

Figure 1A:
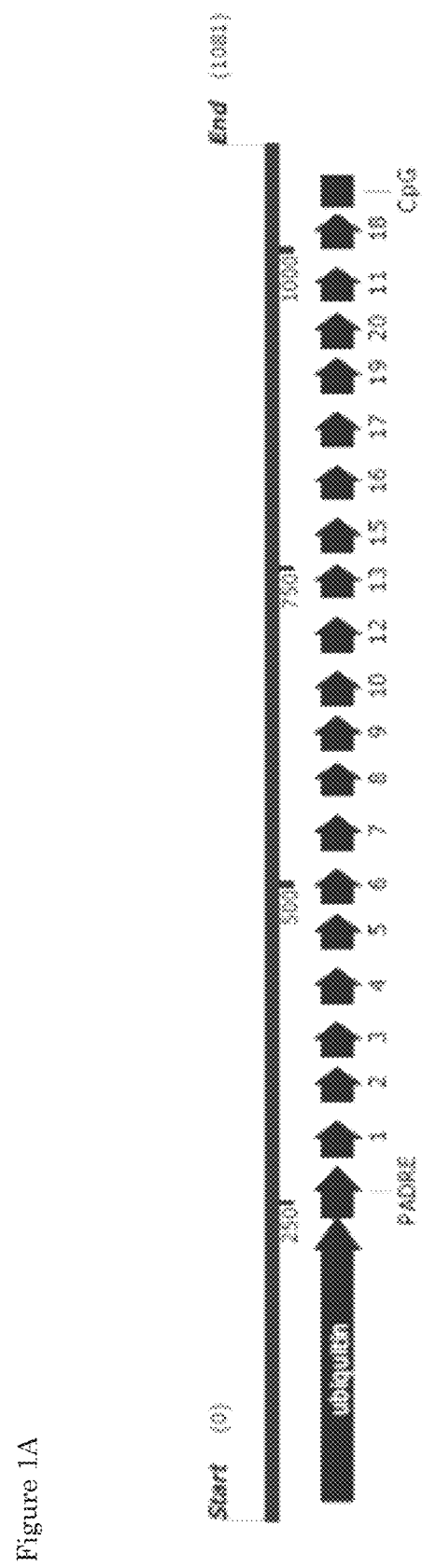

Specification includes a Sequence Listing.

(52) U.S. Cl.
CPC .... *A61K 2039/552* (2013.01); *A61K 2039/70* (2013.01); *C12N 2710/12022* (2013.01); *C12N 2710/12023* (2013.01); *C12N 2710/12034* (2013.01); *C12N 2710/24043* (2013.01); *C12N 2710/24143* (2013.01)

(56) References Cited

OTHER PUBLICATIONS

Wen et al. (Vaccine. 2014; 32: 4420-4427).*
Buan et al. (ImmunoInformatics. Dec. 1, 2022; 8: 100019).*
Liu et al. (Immunology letters. Feb. 15, 2005; 97 (1) :41-5).*
Sira et al. (Veterinary Integrative Sciences .2025; 23 (1): e2025011-1-52. DOI: 10.12982/VIS.2025.011).*
Ravilov et al. (Frontiers in Veterinary Science. 2022 (9): 830244).*
Zhang et al. (Frontiers in Microbiology. 2023; 14: 1139494).*
Zajac et al. (Frontiers in Veterinary Science. Jun. 19, 2023; 10: 1208275).*
Wei et al., "Research Progress and Challenges in Vaccine Development against Classical Swine Fever Virus", 2021, 13, 445.
Velders et al.; "Defined Flanking Spacers and Enhanced Proteolysis Is Essential for Eradication of Established Tumors by an Epitope String DNA Vaccine"; The Journal of Immunolgy, 2001, 166: 5366-5373.
Schubert et al., "Designing string-of-beads vaccines with optimal spacers", Genome Med 8, 9 (2016).

* cited by examiner

Figure 1B

GCTAGCGCCGCCACCATGCAGATTTCGTGAAGACACTGACCGGAAGACCATTACCCTGAAGTCGAGCCATTCAGATACCATTGAGAACGTGAAGGC
          M  Q  I  F  V  K  T  L  T  G  K  T  I  T  L  E  V  E  P  S  D  T  I  E  N  V  K  A

AAAGATTCAGGACAAGGAAGGAATCCCCCCAGATCAGCAGACTGATTTTCGCAGGAAAACAGCTGGAAGACGGGAGAACACTGTCAGATTACAATA
K  I  Q  D  K  E  G  I  P  P  D  Q  R  L  I  F  A  G  K  Q  L  E  D  G  R  T  L  S  D  Y  N

TCCAGAAGGAGTCAACCTGCACCTGGTCTGCTCATACGCCAGACGCCAGATGGAAGACATTCTGCAAAAACCTGCCTTATGCAAGATACATGTCAGTTCTGCCCTA
I  Q  K  E  S  T  L  H  L  V  L  R  G  A  K  F  V  A  A  W  T  L  K  A  A  A  R  Y  K  T

CTGAATCTGCTGCTGTCATACGCCAGAGATGGAGAATCAACAGAAAACTACCCATACGCAGATAACAACCAGTTCATTACCTATCTCAACATGGATATGCAAGATACAGAA
L  N  L  L  S  Y  A  D  A  R  W  K  T  F  C  K  N  L  P  Y  A  R  Y  M  S  V  S  T  F  W  P  Y

TGCCGACGCCAGATGGAGAATCAACAGAAAACTACCCAGATAACAACCAGTTCATTACCTATCTCAACATGGGATATGCAAGATACAGAA
A  D  A  R  W  R  I  N  R  N  Y  Y  P  Y  A  D  N  Q  F  I  T  Y  L  N  M  G  Y  A  R  Y  R

CCGCATCATCAGCCGAACTGTACGCAGACAGAATTTGGGCAACTGGCACAGCAGCTGGCACTGGCAGCTGACTATCAGTTCTCAAACTATAATCAGTTCTGTCCAGCAGACAGAAGATTCTC
T  A  S  S  A  E  L  Y  A  D  R  I  W  A  T  Q  Q  L  A  L  N  Y  A  D  A  R  Y  S  I  I  T  R  H

CTGGAGTATGCAAGATACAAGACCTTCTCAGACCTGTCAAACTATAATCAGTTCATCAATAACCAGTGGTTCATCAACAGCACTGACTTCCTGTACCAGACAGAGATTCT
L  E  Y  A  R  Y  K  T  F  S  D  L  S  N  Y  N  Q  F  V  N  F  V  W  Y  Q  P  F  A  D  R  R  F  S

AATGTCACTGAACTACTATTTCTACGCAGATGCCCAGTGGTTCATCAATTCAACAGATTCCTGTACAGAAGATGGGCAATTAACACCTTCATGTACT
M  S  L  N  Y  Y  F  Y  A  D  A  Q  W  F  I  N  S  T  D  F  L  Y  R  R  W  A  I  N  T  F  M  Y

ATTATGCCGATGCCAGATGGTACCAGCTGGATCTGTTCACAGCACTGGCCGACGCAAGATGGTGCATCGATCTGGGAGCCAACGCATTCGCCGACGCA
Y  Y  A  D  A  R  W  Y  Q  L  D  L  F  T  A  L  A  D  A  R  W  C  I  D  L  G  A  N  A  F  A  D  A

AGATGGTCATCAATGGAGATAGAATATTTCTCATTCGGAAGAACCCTGGTGTACCAGTGGTACACCCTGAATCACGCATT
R  W  S  S  M  D  D  I  S  A  Y  A  R  Y  C  I  D  L  G  A  D  A  F  A  Q  W  Y  T  L  N  H  A  F

CACACTGGCAGATAGAAGATATTTCTCATTCGGAAGAACCCTGGTGTATTGATAATCGTCGTTTGTCGTTTGTGCATCGATGCAGGCGGC
T  L  A  D  R  R  Y  F  S  F  G  R  T  L  V  Y  *                     CpG

CGC

Figure 1C

ATTTAAATatggacgcatgataagaataatttgaagcattggaagcaactaactatgtgatgtgtcttggaatcaattacagaTAAAAATAGAAACT
ATAATCATATATAATAGTGTAGGTTGGTAGTTGTGTAGTATTGCTCTTGTGTAGAGACTTTAGTTAAGGTACTGTAAAAATAGAAACTATAATCATATATAGTG
TAGGTTGGTAGTAGGGTACTCGTGATTAATTTATTGTTAAACTTGTCCTTAAGTCTGCCACCATGGATTTTATTTTAAATATATCCATGAAAATG
GAGGTCATCTTCAAAACGGATTTAAGATCATCTTCACAAGTTGTGTTTCATGCGGGTAGCTTGTATAATTGGTTTTCTGTTGAGATTATCAATAGCG
GTAGAATTGTTACGACCGCTATAAAACATTGCTCAGTACTGTTAAGTATGATATTGTGAAATCTGCTCATATATATGCAGGGCAAGGTATACTGA
ACATCAGGCTCAAGAAGAATGAATGGAATATGATTCTGACATGTGCTGTGTGTTTGAAGAGGAGACAGAATCCTCAGAGGAACAGAATCATGAAAAAAT
GATAATGAAACCAATGACTGCAACATATTGAACAATATGGAAAGGCACCTGAAACATTGTTTGAGCAATGTTACAAGGTTATTAGAGCACATAACTTTATTCAACCATTCATGGAAC
CACAAAAGACTGTGCAACATATTGAACAATATGGAAAGGCACCTGTAAGACTCATGGTCATTAAGAAGACGATGACGATAAGTAGTAGTT
CCCTCTAAAGGAAGAAGAAAAAGAGGTGGTAAGACTCATGGTCATTAACTTTTAAAAAAAAGATTACAAGGACGATGACGATAAGTAGTAGTT
TTTATATAAAAAGGCGCGCCATAAAATTTTTATACTAGTGTACCGCGGTCGAATCGATTTAATTAACGATGCTAGCATTGTCGACGGTGGTGGCGC
GGCCGCctcgagaaaaattgaaaatacaaggttcttgagggttgtgttaaattgaaagcgagaaatcataaagccaccacgtttg
ccaccATGGCAGAATTTAATATTGATGAGCTTCTCAAAAACGTATTGGAGGATCCCTCACTGAAATATCCGAAGAAACGCTTAAACAGCTTTATCA
AAGGACGAACCCTTACAAACAGTTCAAAAATGATAGCAGGGTGGCCTTTTGCTTCTCTTTTGCTCTTGCAAATTTGCGGGAGCAGTATATTCGACGTTCTTATAATG
ACTAGCTTTATTGGATATGTCTTCAAAGCTCTGCAGGAATGGATGCCTTCCTATTCAAAACTACCCACACGACCAAAACTCTTTCTCAGTGAGCTAA
TAACGTTAGTTGATACTTTGAAACAGGAAACTAAATGATGTTCCCTCGAAATCGGTAGTAAATACAATTTTATCTATAGCGGATAGCTGCAAAACCCA
GACGCAGAAAAGCAAGGAAGCTAAAACAAACGATCGATAGCTTTTTACGAGAACATTTGTGTTTGATCCTAATCTTCATGCTCAAAGTGCGTATACT
TGTGCAAGCACTTGTGCAGATACCAATGTAGAGACACCTGTGCAAGCACTTGTGCAAGCACTTGTGCAAGCACAG
GTGCAAGCACTTGTGCAGATACCAATGTAGAGACACCTGTGCAAGCACTTGTGCAGATACCAATGTAGAGACACCTGTGCAAGCACTGTGCAGATACCAA
TGTAGACACCTGTGCAAGCACTGTGCAGATACACCGATTTAGCAGATCCTGAGCGCCATCCCTTTACACATCATGCAAAAAACATTAAATGTGCCTAATGAGC
GCAAACACCTGTGCAAGCACAGAATACACCGATTTAGCAGATCCTGAGCGCCATCCCTTTACACATCATGCAAAAAACATTAAATGTGCCTAATGAGC
TTCAGGCCGATATTGATGCAATTACCCCAAACCCCACAGGGCTATAGGGCAGCCCACATATTACAAATATAGAACTTCATCAAAGCATTAAACA
TATGCTTGAAAATCCGAGGGCGTTTAAACACAAAATTACAAAAATTACTAGATATCTTTCGCAGCATATTCCACCTCAGGATACTTTCTAT
AAGTGGAATTATTACATTGAGGATAATTACGAAGAGTTGCGGCCGCTACGGAAGCATTCACCCGACCTAGAGTTTGCCTTCATTA

Figure 1C continued

TTTATGATGTGGTGGATAGCAGCAACCAACAAAAGGTTGATGAATTTTATTATAAATATAAAGACCAGATTTCTCAGAGGTTTCATCCAT
TCAATTAGGCAACTGGACACTCCTGGGAAGCTTTAAGGCCAACAGAGCGCTACAATTATTTAATCAAAATAATGAAATAAAACGGATTTTGG
ACCGTCATGAGGAAGACCTAAAGATAGGAGAGATTCTACGAAATACCATTTACCACAAAAAAGCAAAAATATACAAGAACCGGCCCGATGCT
CCGGGGCTCTCCATCTATAATTCAACCTTTCACACGGATAGCGGGATTAAGGGACTGCTTTCCTTTAAGGAGCTAAAAACCTAGAAAAGCATCTGG
AAATATCAAAAAAGCTCGAGAGTATGATTTTATAGACGACTGCGAAGAAAAAATTAAGCAACTGCTTAGTAAAGAAAATTAACCCCCGATGAAGAAA
GCGAGCTGATAAAAAACAGAGTTAAATACAGTTAAATATGCGCTTGAAATGCTCAATGTGCCTGATGATACGGGTAGATATGTGGGTCAACAATAAT
AATAAAACTCGAAAAGAAATTTTATATACAAAAGCAGAATTGGACTACAAGGACCACGACGGTGACTACAAGGACCGACTACAAGGACGA
CGACGACAAGTGATTTTATAAATTTTTTTATGATATTTTTACAAAAATGTATAAAGTGTATGTCTTATGTATATTTATAAAAATGCTAAATATGC
GATGTATCTATGTTTAttctccgtgataggtatcgatgaaggacagttcttccagacattgttgaattctgtgagcgtatgcaaacgaATTTAAAT

Figure 1D

ATTTAAATatggacgcatgataagaataatttgaagcattggaagcaactaaactatgtgatgtcttggaatcaattacagaTAAAAATAGAAACTA
TAATCATATAATAGTGTAGGTTGGTAGTATGCTCTCTTGTGACTAGAGACTTTAGTAGTACTGTAAGGTACTGTAAAAATAGAAACTATAATCATATAATAGTGTA
GGTTGGTAGTAGGGTACTCCGTGATTAATTTTATTGTTAAACTTGTCCTTAAGTCTTGCCACCATGGATTCTGAATTTTTTCAACCGGTTTATCCGCGG
CATTATGGTGAGTGTTTGTCACCAGTCACCCCACCAAGCTTCTTCTCCACACATATGTATACTATTCTCATTGCTATCGTGTCTTAGTCATTATTAT
CATCGTTCTAATCTATCTATTCTCTTCAAGAAAGAAAAAAGCTGCTGCCGCTATTGAGGAGGAAGATATACAGTTTATAAATCCTTATCAAGATCAGC
AATGGGCAGAAGTCACTCCACAACCAGTGCTTACGGACAGCAAGTGCAGGCAAACCAGTCACGGCAGACCGGCAACAAAC
AGACCAGCAACAAACAAAGCCTTACACGACAGTCACTCAGAACCAGTTACGGACAACTGCTTCACAAACAATGTCGGCTATTGAAAATTTACGACAAAGAAACACCTATACGC
TCATCCGACTGAGCCTTACACGACAGTCACTCAGAACCAGTTACGGACAACTGCTTCACAAACAATGTCGGCTATTGAAAATTTACGACAAAGAAACACCTATACGC
ATAAAGACCTAGAAAACTCCTTGACTACAAGGACGATGACGACAAGTAGTTTTTATATAAAAGGCGCCATAAAAATTTTTATACTAGTGT
ACCGCGGTCGAATCGATTTAATTAACGATGCTAGCATTGTCGACGGTGGTGGCGGCCCTCGAGAAAATTGAAATACAAAGGTTCTTGA
GGGTTGTGTTAAATTGAAAGCGAGAAATAATCATAAAATAAGCCACCACCGTTGCCACCATGTGTTTAAATAGTTTTAAACAATATTATAAATATGG

Figure 1D continued

```
AGTACTTTAAATCAAACTGTATTTTAAATAATATTTTACAATTAATAATGATACATATTATGGTGGTCTATTTTGGAATACATATTATGATAATAATCGTAG
TAATTTTACTTATTGTGGAATAGCAGGAAATTATTGTTCATGTTGTGGTCATAACATATCATTGTATAATACAACAAATAATTGTAGTTTAATTATTT
TTCCTAACAATACAGAAATATTTAATGAACATATGAATTAGTATATTGGACAAAAAATTAATACAGTAAAACTATTAAAATCTGTTGATTCC
CCAACTATTACATATATAATTGTACTAATTCTTTAATAACATGTAAAAATAATGGGACAAAATGTTAATATATATTAATTATTAACAATACAATTGT
TAATGATACTAATGGAGATATCCTTAATTATTATTGGAATGGTAATAATAATTTTACAGCTACATGTATGATTAATAATACAATTAGTTCATTGAATG
AAACAGAAATATAAATTGTACTAATCCAATATTAAAATATCAAAATTATTTATCCACATTATTTTATATCATAATaTTTATTGTGAGTGGATTAATA
ATAGGTATaTTTATTTCAATCATATCTGTATTATCTATACGAAGAAAAAGAAAAAACATGTTGAAGAAATAGAAAGTCCACCACCCTCTGAATCTAA
TGAAGAAGATATTTCTCACGATGACACCACTTCCATACATGAACCATCTCCCAGAGAACCATTACTTCCTAAGCCTTACAGTCGTTATCAGTATAATA
CACCTATTACTACATGCGTCCCTCAACACAACCACTCAACCCATTTCCCCTACCTAAACCATGCCCGCCACCTAAACCATGTCCTCCACCCAAGCCA
TGCCCGCCACCCAAACCATGTCCTCCACCTAAACCGTGTCGTCCAAACCATGTCCTCCACCTAAACCATGTCCTCCACCTAAACCATGTCCTCC
ACCTAAACCATGTCCTCCACCTAAACCATGTCCTCCATCCAAAACATGTCCTTCACCTGAATCCTATTCTCCACCCAAACCACTACCTAGTATCCCGT
TACTACCCAATATCCCGCCATTATCTACACAAAATATTTCGCTTATTCATGTAGATAGAATTATTGACTACAAAGACCATGACGGTGATTATAAAGAT
CATGACATCGACTAAGGATGACGATGACAAGTAGTTTTTACAAAAATGTATAAAGTGTATGTCTTATGTAT
ATTTATAAAATGCTAAATATGCGATGTATCTATGTTATTTTTATTTTTTTTTTGGAATATAAATATCCGGTAAAATGAAAAAATATACACTAATT
AGCGTCCGTTTCAGACGCTAGCTCGAGGCCACCATGGTTGAGCCACGCGAACAGTTTTTTCAGACCTGCTTTCAGCAGTGGATCAACAAATGGACA
CTGTAAAAAATGACATAAAAGACATCATGAAGAGAAAAACATCTTTTATGGTGTCATTCGAAAACTTTATAGAACGTTACGATACCATGGAAAAAAT
ATTCAAGACCTTCAGAATAAGTACGAAGAAAATGGCGGCCAACCTTATGACCGTCATGACCTTGGAGCCATTATCGCCCAACT
TGAGATTCTGATGATAAATGGCACTCCGGCAAAAAACGATTAAGGAGGCTATGCCCTACCTTCATCAAACAACAATGATCAAA
CGAGTCCTCCCGCCTCAGGCAAAACAAGTGAAAACACCTAAAAAAAAATCCCACGAATGTCTTCACGCGTAGCGAATGGGCATCCTCGAAAACT
TTTCGAGAAAGTTTTAACACCAGAATTCAGGCCATATTGGATGAGCAGTTTGCAAACAAGACCGGGATCGAAAGATTGCATGCCGAGGGTCTTTA
CATGTGGAGAACCCAATTCTCTGACGAACAGAGAAGAAATGGTCAAAGAGATGATGAAGAGATGAAGAGATTACAAGGACGATGACGATAAGTAGATTGTTGCAA
ATATACAGAAATAGAAATATTAATTTTTATACTACAATGGACAACATTATGTCGGCCGAGTATTATCTCTTTATGCCAAATATAATtttctccg
tgataggtatcgatgaaggacagttcttccagacattgttgaattctgtgagcgtatggcaaacgaATTTAAAT
```

Figure 1E

ATTTAAATatggacgcgatgataagaataatttgaagcattggaagcaactaaactatgtgatgtcttggaatcaattacagaTAAAAATAGAAACTA
TAATCATATAATAGTGTAGGTTGGTAGTATTGCTCTTGTGACTAGAGACTTTAGTTAAGTACTGTAAAATAGAAACTATAATCATATAATAGTGTA
GGTTGGTAGTAGGGTACTCGTGATTAATTTTATTGTTAAACTTGTCCTTAAGTCTTGCCACCATGGCATCAGGAGGAGCTTTcTGTCTTATTGCTAAC
GATGGGAAGGCCGACAAGATTATATTGGCCCAGACTTGCTTAATAGCAGGATTTCTAACATTAAAAATGTGAACAAAAGTTATGGAAACCCGACCC
CGAACCCACTTTGAGTCAAATCGAAGAAACACATTTGGTTCATTTTAAGTGCCATTTTAAGCCTTATGTTCCAGTAGGGTTTGAATACAATAAAGTAC
GCCCGCATACGGGTACCCCCCACCTTGGGAAACAAGCTTACCTTTGGTATTCCCCAGTACGGAGACTTTTTCCATGATATGGTGGGCCACCATATATTG
GGTGCATGTCATTCGTCCTGGCAGGATGCTCCGATTCAGGGCACGGCCCAGATGGGGCCCATGGTCTCAAACGTTCCTCGCAACGGATATGA
CTGGGACAACCAAACACCTTTAGAGGGCGCCGTTTACACGCTTGTAGATCCCTTTGGAAGACCTATTGTACCCGGCACAAAGAATGCGTACCGAAACT
TGGTTTACTACTGCGCAAATTTTGCATCCCAGGGATAAAATGACTGGATATATAAGCACTTGGTCGGCTATCGGTGGAGGAACTAGTGGCCCCTCT
ACGCTTGTGCGCAAATTTTGCATCCCAGGGATAAAATGACTGGATATATAAGCACTTGGTCGGCTATCGGTGGAGGAACTAGTGGCCCCTCT
CCTATGCAACATTCATGATTTGCACAAGCCGCACCAAAGCAAACTCTATTCTTACCGATGAAAATGATACGCAGCGAACGTGCAGCCATACCAACCCGA
AATTCCTTTCACAACATTTTCCCGAGAACTCTCACAATATCCAAACAGCAGGTAAACAAGATATTACTCCTATTACGGACGCAACGTATCTGGACATA
AGACGTAATGTTCATTACAGCTGTAATGGACCTCAAACTCAAACCCCTCTTGCGCTCTGATTAAGCTGCGCTTTTGGTTTAACGA
GAACGTGAACCTTGCTATTCCCTGCGTTTTACATCAATAAGCTTTATCACCATATACGCAATATACAACCTgTTGTGTAAACGCGTTCGATTTTCCCGATACG
CTGGACTcTTTTATACGCCAGTGCGCGTTTTACATCAATAACCTGTTGTAACCCCTGAAATACAACAACCTgTTGTGTAAACGCGTTCGATTTTCCCGATACG
ATCTCGCTCACGAATAATGAACTTTACATCAATAACCTGTTGTAACCCCTGAAATACAACTAATGTCTGCTCTTAAATGCCCATTGAATATATGTTTATAGGAT
TGTCCATAAAACGCAGGTGACCCACACCACACCACGATGAAAAACTAATGTCTGCTCTTAAATGCCCATTGTTAACGCCATTATGCAGCTACTCAC
TAAAACCTACCTGGAACATCTCCGATCAAATCCTCATCAACACCGAGATTGGCACAGTTCGGACATGTTGTTAACGCCATTATGCAGCTACTCAC
CACGCAGAGATAAGCTTTCAGGATAGAGATACAGCTCTTCCAGACGCCATGTTCATCTATATCGGATATTAGCCCCGTTACGTATCCGATCACATTACC
TATTATTAAAAACATTTCCGTAACTGCTCATGGTATCAATCTTATCGATAAGTTTCTGCAGCTCTTACATACCCTTCCACTACGGAG
GCAATGCAATTAAAACCCCCGATGATCGGGTGCGATGATGATTACCTTTGCTTTGAAGCCACGGGAGGAATACCAACCCAGTGGTCATATTAACGTA
TCCAGAGCAAGAATTTTATATTAGTTGGGACACGGATTACGTGGGGTCTATCACTACGGCTGATCTTGTGGTATCGGCATCTGCTATTAACTTTCT

Figure 1E continued

TCTTCTTCAGAACGGTTCAGCTGTGCTGTGCGTTACAGTACCGACTACAAAGACCATGACGGTGATTATAAAGATCATGACATTGACTACAAGGATGACG
ATGACAAGTAGTAGGTTTTTATATAAAGGCGCGCCATAAAATTTTTATACTAGTGTACCGCGGTCGAATCGATTTAATTAACGATGCTAGCATTG
TCGACGGTGGTGGCGCGGCCGCCCTCGAGAAAATTGAAAATAAATACAAAGGTTCTTGAGGGTTGTGTTAAATTGAAAGCGAGAAATAATCATAAATA
AGCCACCACCGTTTGCCACCATGTCGACAAAAAAAGCCCACAATTACCAAGCAAGAGCTTTACTCCTTAGTAGCGGCAGATACCCAGTTAAATAAA
GCATTGATTGAAAAGAATCTTTACAAGCCAGCAAAAAATAATCCAAAATGCTTTAAAGCACACAATCAAGAAGTTATTATACCACCCGGAATCAAGTTCAC
CGTCGTTACAGTGAAAGCTAAACCTGCTCGCCAACCCGCAACAGGAGCCTATTCAAATTAAAGCCAAGCCTGAACATAAAGCCGTAA
AGATACGAGCATTGAAACCTGTTCATGATATGTTAAATGACTACAAGGATGACGATGACAAGTAGTTTTTATAAATTTTTTTATGAGTATTTTACA
AAAATGTATAAAGTGTATGTCTTATGTATATTTATAAAAATGCTAAATATGCGATGTATCTATGTTATtctccgtgataggtatcgatgaaggacag
ttctttccagacattgttgaattctgtgagcgtatggcgtatggcaaacgaATTTAAAT

AFRICAN SWINE FEVER VIRUS VACCINE

SEQUENCE LISTING

The instant application contains a Sequence Listing which has been submitted electronically in ASCII format and is hereby incorporated by reference in its entirety. Said ASCII copy, created on Apr. 19, 2024, is named MOR11003P00330US_SL.txt and is 32,442 bytes in size.

FIELD

The invention relates to the field of viruses, more specifically, to the field of African Swine Fever Virus (ASFV). The invention relates to methods for the generation of a vaccine that protects against infection with ASFV, and to the use of such vaccine for preventing or ameliorating infection and/or spread of African Swine Fever Virus in pigs.

BACKGROUND

African Swine Fever (ASF) is a viral disease to which only pigs and wild boar are susceptible. After the initial infection, symptoms can take two to ten days to appear. Depending on the pathogenicity of the virus, 30% to 100% of the infected animals die. Common symptoms include: loss of appetite, weakness, red skin, inflamed ocular mucous membranes, vomiting, bloody diarrhoea and fever. In addition, the skin may turn blue, areas of skin may die off (black stains) and haemorrhages may occur. Furthermore, the disease can cause spontaneous abortions in pregnant sows. Sudden death, without any prior noticeable symptoms, may also occur. The symptoms of ASF resemble those of classical swine fever.

Pigs can survive the acute phase and appear to have recovered, only to become long-term carriers of the virus (from a few months to the entire lifespan), and thus excrete the virus again and infect other animals.

The virus spreads directly from animal to animal and indirectly through contaminated materials such as feces, pork and other pig products, biting flies and ticks, especially via a species of soft tick, *Ornithodoros moubata*, in which the virus multiplies. Food waste or offal from infected pigs, may also contain ASF that contribute to spread of the virus. Attempts such as international measures and maintaining vigilance on pig farms are being made to prevent the further spread of the disease. Since 2007, there have been several outbreaks of ASF in Eastern Europe, China and Russia. ASF was recently diagnosed in a wild boar population in Belgium.

ASF is caused by a large double stranded DNA virus belonging to the family Asfarviridae. The DNA genome shows significant variations in length from 160 to 210 kbp, depending on the isolate. The genome encompasses between 150 and 167 open reading frames, specifying the 54 structural proteins of the ASFV particle and more than 100 infection proteins [Dixon et al., 2013. Virus Res 173:3-14]. Eight serogroups have been identified thus far, named serogroups 1-8, but more likely will exist. The complexity and variability of the virus have complicated the generation of a vaccine that protects against ASF infections. Several different approaches have been used, including inactivated vaccines, subunit vaccines, attenuated live vaccines, and recombinant live attenuated vaccines [Arias et al., 2017. Vaccines 5, 35: doi: 10.3390/vaccines5040035].

Inactivated vaccines were found to provide no protection, even in the presence of adjuvants [Stone et al., 1967. Am J Vet Res 28:475-481: Blome et al., 2014. Vaccine 32:3879-3882].

Subunit vaccines have provided no or only partial protection. This may in part be due to the large number of encoded proteins (~160) and the difficulty to select relevant proteins. In addition, the sequence of a large number of ASFV proteins does not resemble known proteins [Dunigan et al., 2006. Virus Research 117:119-132], making it difficult to predict a function of these proteins.

Live attenuated vaccines are either obtained from virulent strains or from naturally low virulent strains such as OURT88/3 [Boinas et al., 2004. J Gen Virol 85:2177-2187] and NH/68 [Gil et al., 2008. Arch Virol 153:1845-1854]. These live attenuated vaccines often provide up to 100% protection against homologous strains, but only partial cross-protection against heterologous strains. In addition, they often induce unacceptable side effects such as pneumonia, locomotive disturbances, necrotic foci, abortion, and even death [Sanchez-Cordón et al., 2018. Vet J 233:41-48: Arias et al., 2017. Vaccines 5, 35: doi: 10.3390/vaccines5040035].

Most promising results have recently been obtained with recombinant live attenuated vaccines in which gene deletions, or combinations of gene deletions, have been introduced to achieve acceptable levels of safety and efficacy. Protection against certain isolates was observed, although combined with varying levels of residual virulence, apparently depending on the individual strain that was used [Sánchez-Cordón et al., 2018. Vet J 233:41-48; Arias et al., 2017. Vaccines 5, 35; doi: 10.3390/vaccines5040035]. The long term genetic stability of these deletion mutants is not known, as are the results of a larger trial in field conditions.

There is thus a need to provide a vaccine that is effective and safe and provides protection against infection with a large number of different ASFV strains.

2 SUMMARY OF THE INVENTION

The invention therefore provides a recombinant nucleic acid molecule, preferably recombinant DNA molecule, comprising an expression cassette encoding a polyepitope comprising T-cell antigens from proteins of African Swine Fever Virus, wherein the T-cell antigens are separated by spacers, preferably by spacers of 1-10 amino acid residues, that contain signals for proteasome cleavage. Said polyepitope preferably comprises 2-50 peptides as T-cell antigens Said polyepitope preferably comprises 2-50 nonapeptides as T-cell antigens, preferably nonapeptides 1-13 and 15-20 as depicted in Table 1, which are separated by spacers of about 1-5 amino acid residues, preferably spacer sequences 1-11 as depicted in Table 2.

A recombinant molecule of the invention may further encode a universal T-cell epitope. Said recombinant molecule of the invention may further comprise a nucleotide sequence for ubiquitin, preferably at the 5'-terminal end of the polyepitope.

The invention further provides a viral particle, comprising the recombinant molecule of the invention. Said viral particle may further comprise a marker protein.

The invention further provides a method of stimulating an immune response in a pig comprising administering the recombinant molecule of the invention, and/or the viral particle of the invention. Said administration preferably is in combination with a viral particle comprising B-cell antigens of African Swine Fever Virus, preferably selected from proteins p30, p54, p72, EP402R, A104R and/or B602L of African Swine Fever Virus, to the pig in an amount effective to induce an immune response. Said recombinant molecule is preferably administered parenterally, preferably intramuscularly and/or intradermally, preferably by immune-electroporation. Said recombinant molecule and/or the viral particle preferably is administered 2-4 times, preferably with intervals of about 2 weeks. It is preferred that at least one of the administrations of the recombinant nucleic acid molecule and/or the viral particle is combined with administration of synthetic T-cell antigens from proteins of African Swine Fever Virus. At least one of the repeated administrations of the recombinant molecule and/or the viral particle is combined with administration of a viral particle comprising B-cell antigens of African Swine Fever Virus, preferably selected from proteins p30, p54, p72, EP402R, A104R and/or B602L of African Swine Fever Virus.

The invention further provides a composition, comprising the recombinant nucleic acid molecule of invention, and/or the viral particle of the invention, and a veterinary acceptable excipient.

The invention further provides a vaccine, comprising an effective immunizing amount of the composition comprising the recombinant molecule of invention, and/or the viral particle of the invention, and a veterinary acceptable excipient.

The invention further provides a method for preventing or ameliorating infection and/or spread of African Swine Fever Virus in pigs, comprising administering a recombinant molecule of the invention, and/or a viral particle of the invention to at least one pig. Said administration of the recombinant molecule and/or the viral particle is preferably combined with administration of a viral particle comprising B-cell antigens of African Swine Fever Virus, preferably selected from proteins p30, p54, p72, EP402R, A104R and/or B602L of African Swine Fever Virus.

The invention further provides a viral particle comprising B-cell antigens of African Swine Fever Virus, preferably selected from proteins p30, p54, p72, EP402R, A104R and/or B602L of African Swine Fever Virus.

The invention further provides a set of viral particles and a kit of parts comprising B-cell antigens of African Swine Fever Virus, preferably selected from proteins p30, p54, p72, EP402R, A104R and/or B602L of African Swine Fever Virus.

The invention further provides a set of viral particles comprising a viral particle comprising the recombinant molecule of any one of claims 1-5, and one or more viral particles comprising B-cell antigens of African Swine Fever Virus, preferably selected from proteins p30, p54, p72, EP402R, A104R and/or B602L of African Swine Fever Virus.

The invention further provides a kit of parts, comprising a viral particle, comprising a recombinant molecule of the invention and one or more viral particles comprising B-cell antigens of African Swine Fever Virus, preferably selected from proteins p30, p54, p72, EP402R, A104R and/or B602L of African Swine Fever Virus.

The invention further provides a kit of parts comprising a viral particle comprising a recombinant molecule of the invention and synthetic T-cell antigens from proteins of African Swine Fever Virus.

The invention further provides a viral particle comprising B-cell antigens of African Swine Fever Virus, or the set of viral particles comprising B-cell antigens of African Swine Fever Virus, for use in a method of protecting a pig from subsequent infection with African Swine Fever Virus.

3 FIGURE LEGENDS

FIG. 1. Sequences

1A. Insert of recombinant nucleic acid molecule, indicating ubiquitin and T-cell epitopes.

1B. Insert of ASFDVAC2. Indicated in bold are the ubiquitin amino acid sequences, and T-cell antigens 1, 2, 3, 4, 5, 6, 7, 8, 9, 10, 12, 13, 15, 16, 17, 19, 20, 11, and 18, as indicated in Table 1. Italics denote the PADRE amino acid sequences and the CpG nucleic acid sequences. Figure discloses SEQ ID NOS 33-34, respectively, in order of appearance.

1C. MVA-p30+B602L nucleic acid sequences (3106 bp). Indicated are, from 5' end, a SwaI site in capitals, the left flank of TK, the MVA 13.5L promoter in bold and underlined, a Kozak sequence, in bold the coding sequence of the p30 gene from strain E75, underlined a FLAG®-tag (a registered trademark of Sigma-Aldrich for a hydrophilic peptide sequence used for detection and purification) sequence, a stop codon in italics, in capitals termination sequences from mH5, mH5 early/late promoter sequences in bold and underlined, a Kozak sequence, coding sequences for BA71V-B602L (9RL) in bold, underlined a triple FLAG®-tag sequence, a stop codon in italics, in capitals termination sequences from C11R, the right flank of TK and a SwaI site in capitals. Figure discloses SEQ ID NO: 36.

1D. MVA-p54+EP402R+K205R nucleic acid sequences (3309 bp). Indicated are, from 5'end, a SwaI site in capitals, the left flank of TK, the MVA 13.5L promoter in bold and underlined, a Kozak sequence, in bold the coding sequence of the p54 gene, underlined a FLAG®-tag sequence, a stop codon in italics, in capitals termination sequences from mH5, mH5 early/late promoter sequences, coding sequences for BA71V-B602L (9RL) in bold, underlined a triple FLAG®-tag sequence, a stop codon in italics, in capitals termination sequences from C11R. the LEO promoter sequences in bold and underlined, a Kozak sequence, in bold the coding sequence of the BA71V-K205R gene, underlined a FLAG®-tag sequence, a stop codon in italics, in capitals termination sequences from M2L, the right flank of TK and a SwaI site in capitals. Figure discloses SEQ ID NO: 37.

1E. MVA-p72+A104R nucleic acid sequences (2992 bp). Indicated are, from 5'end, a SwaI site in capitals, the left flank of TK, the MVA 13.5L promoter in bold and underlined, a Kozak sequence, in bold the coding sequence of the p72 gene, underlined a FLAG®-tag sequence, a stop codon in italics, in capitals termination sequences from mH5, mH5 early/late promoter sequences in bold and underlined, a Kozak sequence, coding sequences for BA71V-A140R in bold, underlined a FLAG®-tag sequence, a stop codon in italics, in capitals termination sequences from C1R, the right flank of TK and a SwaI site in capitals. Figure discloses SEQ ID NO: 38.

Figure 2A:
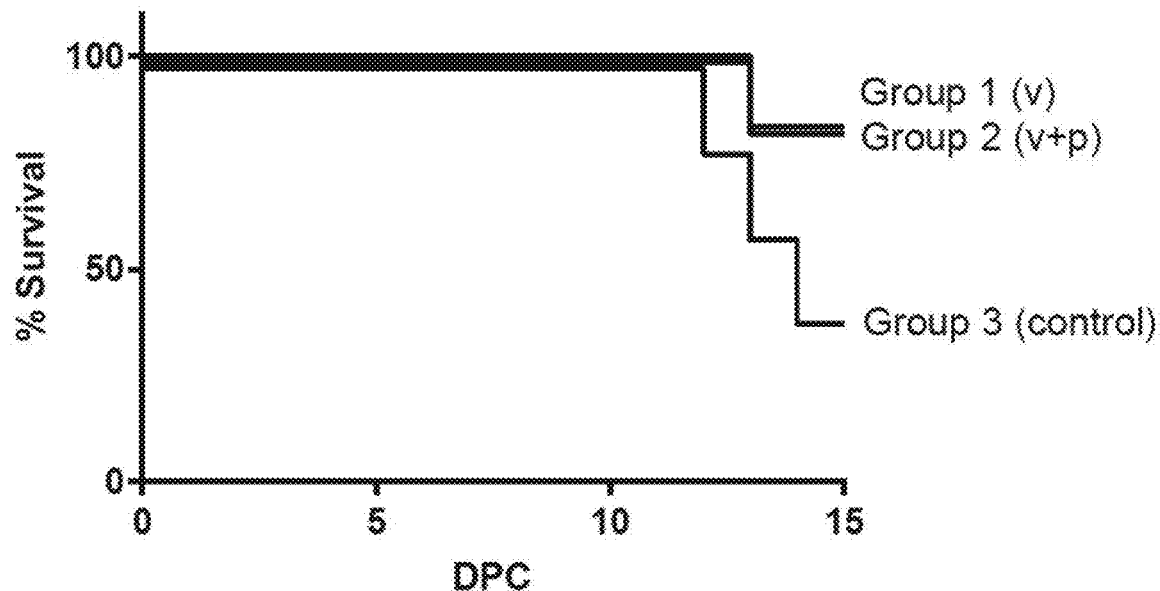

FIG. 2. Results from vaccination with recombinant nucleic acid construct

2A. Survival curves. 2B. Clinical scores per group on the indicated days post challenge (DPC). White columns denote animals that died. 2C. ELISPOT results from peripheral blood mononuclear cells that were isolated from the pigs at the indicated DPC. Cells were stimulated with medium, virus and peptides (vaccine) as indicated.

FIG. 3. Results from vaccination with viral constructs

3A. Survival curves. 3B. Average morbidity indexes from pigs in different groups. 3C. Cell-mediated immune response of three treatment groups. Peripheral blood mononuclear cells were isolated from the pigs at the indicated days post challenge (X-axis: DPC). Y-axis: Interferon gamma production as determined with ELISPOT. Cells were stimulated with medium (Neg. Control), virus (AVP) and peptides as indicated.

4 DETAILED DESCRIPTION

4.1 Definitions

As is used herein, the term "T cell epitope" or "T cell antigen", refers to an epitope that can be recognized by the immune system after intracellular processing of an antigen. After processing, a T cell epitope becomes bound to at least one MHC molecule and is expressed on the surface of the antigen presenting cell as a MHC-peptide complex. T cell epitopes presented by MHC class I molecules are typically between 8 and 11 amino acids in length, whereas MHC class II molecules may present peptides of about 12-25 amino acids, preferably about 13-17 amino acids, in length. Software programs are available that may predict potential T cell epitopes within proteins on the basis of, for example, amphipathicity profiles of proteins, sequence motifs, quantitative matrices, artificial neural networks, support vector machines, quantitative structure activity relationship and molecular docking simulations [Desai and Kulkarni-Kale, 2014. Methods Mol Biol 1184:333-64]. These programs include IEDB Analysis Resource, ELISpot (PepScan, Lelystad, the Netherlands), RANKPEP [Reche et al., 2004. Immunogenetics 56:405-19], nHLAPred [Bhasin and Raghava, 2007. J Biosci 32:31-42], and NetMHC [Lundegaard et al., 2008. Nucleic Acids Res 36: W509-12].

A preferred T cell epitope, or T cell antigen, as this term is used in this application, is a MHC class I epitope, also termed cytotoxic T cell epitope, comprising 8-11 amino acid residues, preferably about 9 amino acid residues.

As is used herein, the term "polyepitope" refers to a biomolecule, preferably a peptide or protein, that has multiple epitopes such as T-cell epitopes, preferably MHC class I epitopes. Said individual epitopes preferably are separated by linker sequences. Said linker sequences allow flexibility and may be involved in processing of the polyepitope into the individual epitopes.

As is used herein, the term "expression cassette" refers to a nucleic acid molecule that provides expression of one ore more open reading frames that are present in said cassette. An expression cassette preferably comprises a promoter sequence, at least one open reading frame, and a 3' untranslated region that preferably comprises a polyadenylation signal. An expression cassette may further comprise enhancer sequences, one or more post-transcriptional regulatory elements and/or one or more intron sequences. For expression in eukaryotic cells, said post-transcriptional regulatory elements and/or one or more intron sequences may enhance nuclear export of a transcription products, i.e. a messenger RNA, of the expression cassette to allow translation of the RNA in the cytoplasm. Said expression cassette preferably is optimized for expression in pigs.

As is used herein, the term "peptide" refers to a proteinaceous molecule that comprises 2-50 amino acid residues. A peptide may be present in a larger protein, prior to processing of the protein into individual peptides.

As is used herein, the term "protein" refers to a proteinaceous molecule that comprises more than 50 amino acid residues.

As is used herein, the term "nonapeptide" refers to a peptide that comprises nine amino acid residues.

As is used herein, the term "spacer" refers to small peptides, preferably 1-10 amino acid residues, more preferably 1-5 amino acid residues, that are present in between the individual epitopes of a polyepitope and allow flexibility and processing of the epitopes by the proteasome and presentation of the individual epitopes by MHC. Amino acid sequences of suitable spacers are provided in, for example, US20130011424, and in Toes et al., 2001. J Exp Med 194:1-12, which are herein incorporated by reference.

As is used herein, the term "universal T-cell epitope" refers to a peptide sequence that is bound and displayed by many different MHC molecules and therefore is assumed to activate the immune system of many individuals. Said universal T-cell epitope preferably is a MHC class II epitope, also termed T helper cell epitope.

As is used herein, the term "nucleotide sequence for ubiquitin" refers to a nucleotide molecule that encodes ubiquitin. Ubiquitin is a 76-amino acid protein whose sequence is highly conserved throughout evolution from invertebrates to mammals. Ubiquitin is involved in ATP-dependent nonlysosomal proteolysis. Said nucleotide sequence preferably expresses the amino acid sequence N-

N-MQIFVKTLTGKTITLEVEPSDTIENVKAKIQDKEGIPPDQQRLIFAG
KQLEDGRTLSDYNIQKESTLHLVLRLRG.

As is used herein, the term "viral particle" refers to an infectious virus particle or virus-like particle that is attenuated and is not able to spread autonomously. The genome of a virus particle preferably comprise deletions in genes that are relevant for shedding of said particle from an infected cell. Deletion of said genes provides space for insertion of foreign genes encoding, for example, a recombinant DNA molecule, comprising an expression cassette encoding B-cell epitopes and/or T-cell epitopes according to the invention.

As is used herein, the term "pig" refers to an animal in the Suidae family of even-toed ungulates. The term pig includes a domestic pig and its ancestor, the common Eurasian wild boar (*Sus scrofa*), Palawan bearded pig, Bornean bearded pig, Heude's pig or Vietnamese warty pig, Visayan warty pig, Celebes warty pig, Flores warty pig, Mindoro warty pig, Philippine warty pig, Java warty pig, babirusa and warthog.

As is used herein, the term "effective amount" refers to a means an amount of a recombinant molecule according to the invention and/or one or more viral particles according to the invention, that produces an effect on subsequent infection of a pig with African Swine Fever Virus.

4.2 Recombinant Nucleic Acid Molecule

The invention provides a recombinant nucleic acid molecule, comprising an expression cassette encoding a polyepitope comprising T-cell antigens from proteins of African Swine Fever Virus, wherein the T-cell antigens are separated by spacers, preferably by spacers of 1-10 amino acid residues, that contain signals for proteasome cleavage.

Said nucleic acid molecule, preferably RNA or DNA, is preferably produced by recombinant technologies, including the use of polymerases, restriction enzymes, and ligases, as is known to a skilled person. Alternatively, said nucleic acid is provided by artificial gene synthesis, for example by synthesis of partially or completely overlapping oligonucleotides, or by a combination of organic chemistry and recombinant technologies, as is known to the skilled person. Said nucleic acid is preferably codon-optimised to enhance expression of the expression cassette encoding a polyepitope in an vaccinated pig. Further optimization may include removal of cryptic splice sites, removal of cryptic poly A tails and/or removal of sequences that lead to unfavourable folding of the mRNA. The presence of an intron flanked by splice sites may encourage export from a nucleus of infected cells.

In one embodiment, said nucleic acid molecule is RNA, including unmodified RNA, modified RNA and, preferably, self-replicating RNA. Said self-replicating RNA may be based on viral systems for amplification of the RNA molecule such as derived from alphaviruses, flaviviruses, rhabdoviruses, measles viruses and/or flaviviruses. Said RNA may be complexed or condensed with molecules such as nanoparticles, polyethylenimine, cationic lipids including synthetic cationic lipids such as N-[1-(2,3-dioleyloxy) propyl]-N,N,N-trimethylammonium chloride (DOTMA), lipfectamine and SAINT®, and/or chitosans.

The expression cassette preferably comprises means for high expression levels such as strong promoters, for example of viral origin (e.g., human cytomegalovirus) or promoters derived from genes that are highly expressed in a cell such as a pig cell (Running Deer and Allison, 2004. Biotechnol Prog 20:880-889; U.S. Pat. No. 5,888,809).

Further provided is a host cell comprising a recombinant nucleic acid molecule, comprising an expression cassette according to the invention. Said host cell may be grown or stored for future production of a recombinant nucleic acid molecule according to the invention. Said cell preferably is a bacterial cell, for example Escherichia coli.

Nucleic acid preferably is solubilized, for example in a buffered solution such as PBS, prior to administration to a pig. Administration preferably comprises between 1 μg and 1 mg of nucleic acid in total per animal.

Said recombinant nucleic acid molecule, comprising an expression cassette encoding a polyepitope expresses 2-50 T-cell antigens, preferably 5-30 T-cell antigens, more preferably about 20 T-cell antigens such as 18 T-cell antigens, 19 T-cell antigens, 20 T-cell antigens and 21 T-cell antigens, from proteins of African Swine Fever Virus. Suitable T-cell antigens preferably are predicted using available software programs. Preferred T-cell antigens have major histocompatibility complex (MHC) class I binding affinity. A preferred software program that is included in the analysis of suitable T-cell antigens is termed NetMHC [Andreatta and Nielsen, 2016. Bioinformatics 32:511-7], which is based on artificial neural networks that allows insertions and deletions in the alignment. It is able to learn the length profile of different MHC molecules. It is preferred that self-peptides are not selected as suitable T-cell antigens, as these may cause autoimmune disease.

Said 2-50 T-cell antigens are peptides of 6-15 amino acid residues, preferably 8 and 11 amino acid residues, more preferred about 9 amino acid residues, that are separated by spacers, preferably by spacers of 1-10 amino acid residues, that contain signals for proteasome cleavage. Preferred T-cell antigens are derived from African Swine Fever Virus proteins MGF_505-7R, NP1450L, G1340L, B385R, G1211R, E423R, NP1450L, MGF_5059R, E301R, C717R, EP424R, F778R, CP530R, R298L, CP2475L, O174L, MGF_360-2L, NP1450L, M1249L, and/or MGF_360-11.

Preferred T-cell antigens are selected from the peptides indicated in Table 1.

TABLE 1

| | Amino acid sequences of preferred T-cell antigens | | |
|---|---|---|---|
| 1 | TLNLLLSY | 11 | YTLNHAFTL |
| 2 | KTFCKNLPY | 12 | SMSLNYYFY |

TABLE 1-continued

| | Amino acid sequences of preferred T-cell antigens | | |
|---|---|---|---|
| 3 | MSVSTFWPY | 13 | FINSTDFLY |
| 4 | RINRNYYPY | 14 | YYYGYYYQL |
| 5 | ITYLNNMGY | 15 | AINTFMYYY |
| 6 | RTASSAELY | 16 | YQLDLFTAL |
| 7 | ATQQLALNY | 17 | CIDLGANAF |
| 8 | SIITRHLEY | 18 | FSFGRTLVY |
| 9 | KTFSDLSNY | 19 | SSMDDISAY |
| 10 | YRFVWYQPF | 20 | CIDLGADAF |

A preferred recombinant nucleic acid molecule, comprising an expression cassette according to the invention preferably encodes peptides 1-20 of Table 1, more preferably peptides 1, 2, 3, 4, 5, 6, 7, 8, 9, 10, 11, 12, 13, 15, 16, 17, 18, 19, 20, more preferably, from the N-terminal end, in this order, peptides 1, 2, 3, 4, 5, 6, 7, 8, 9, 10, 12, 13, 15, 16, 17, 19, 20, 11, 18.

Said spacers preferably are about 1-5 amino acid residues, including 2 amino acid residues, 3 amino acid residues, and 4 amino acid residues. Preferred spacers include peptides indicated in Table 2.

TABLE 2

| | Spacer sequences | | |
|---|---|---|---|
| 1 | ARY | 7 | AQW |
| 2 | NQF | 8 | ADRRY |
| 3 | ADRRF | 9 | ADNQF |
| 4 | ADAQW | 10 | ADRIW |
| 5 | RRW | 11 | ADARY |
| 6 | ADARW | | |

A preferred recombinant nucleic acid molecule, comprising an expression cassette according to the invention, preferably encodes a universal T-cell epitope. Said universal T-cell epitope preferably is located in front of the T-cell epitopes of African Swine Fever Virus, thus N-terminal to these T-cell epitopes. Examples of such universal T-cell epitopes are provided in Khatun et al., 2017. Chemistry 23:4233-4254. A preferred universal T-cell epitope is provided by a non-natural pan DR epitope termed PADRE, having the amino acid sequence aKXVAAWTLKAAaZC (SEQ ID NO: 29), wherein X denotes L-cyclohexylalanine, and Z denotes aminocaproic acid ((Alexander et al., 2000. J Immunol 164:1625-1633). For expression purposes, a derivative having the sequence AKFVAAWTLKAAAARY (SEQ ID NO: 30) preferably is used.

A preferred recombinant nucleic acid molecule, comprising an expression cassette according to the invention, preferably further comprises a nucleotide sequence encoding ubiquitin, preferably at the 5'-terminal end of the polyepitope. Fusion of ubiquitin to the polyepitope comprising T-cell antigens enhances targeting to the proteasome resulting in improved processing of the polyepitope and enhanced T cell responses.

A preferred recombinant nucleic acid molecule comprises the nucleotide sequence depicted in FIG. 1B.

4.3 Viral Particles

The invention further provides a viral particle, comprising a recombinant nucleic acid molecule, comprising an expression cassette encoding a polyepitope comprising T-cell antigens from proteins of African Swine Fever Virus according to the invention.

The invention further provides a viral particle, comprising a recombinant nucleic acid molecule that expresses B-cell antigens of African Swine Fever Virus. Said B-cell antigens preferably are selected from proteins p30, p54, p72, EP402R (pEP402R), A104R (pA104R) and/or B602L (pB602L) of African Swine Fever Virus. A person skilled in the art will understand that the term "protein EP402R" refers to pEP402R: the term "protein A104R" refers to pA104R; and the term "protein B602L" refers to pB602L. Said B-cell antigens preferably comprise an amino acid sequence of proteins p30, p54, p72. EP402R, A104R and/or B602L of African Swine Fever Virus, preferably comprise substantially complete amino acid sequences of proteins p30, p54, p72, EP402R. A104R and/or B602L of African Swine Fever Virus. Examples of such amino acid sequences are provided by UniProt accession number P34204 (P30_ASFB7) for phosphoprotein p30 from strain Badajoz. 1971: UniProt accession number Q65194 for envelope protein p54 from strain Badajoz. 1971: UniProt accession number P22776 for major capsid protein p70) from strain Badajoz 1971: UniProt accession number Q89501 for the CD2 homolog EP402R from strain Badajoz 1971: UniProt accession number P68742 for viral histone-like protein A104R from strain Badajoz 1971; and UniProt accession number Q65169 for protein B602L from strain Badajoz. 1971.

Said B-cell antigens preferably are expressed using tandem expression cassettes, for example for expression of p30 and B602L: p72 and A104R and/or p54 and EP402R. or triple expression cassettes, for example for expression of p54 and EP402R and K205R) expression cassettes. DNA constructs encoding the B-cell antigens may be generated synthetically, for example obtained from GenScript, as is known to a skilled person. A B-cell antigen-encoding regions preferably is cloned with different MVA promoter and transcription-termination sequences to drive expression of these genes. Furthermore, said B-cell antigens preferably is provided with a sequence tag to allow the detection of protein expression. Suitable tags include a 6×His tag (SEQ ID NO: 39), c-myc domain (EQKLISEEDL (SEQ ID NO: 31)), hemagglutinin tag (YPYDVPDYA (SEQ ID NO: 32)), maltose-binding protein, glutathione-S-transferase, maltose-binding protein. FLAG® tag peptide, biotin acceptor peptide, streptavidin-binding peptide and calmodulin-binding peptide, as presented in Chatterjee. 2006. Cur Opin Biotech 17, 353-358. A FLAG® tag is a preferred tag. Said tag preferably is present at the C-terminus of a B-cell antigen.

Viral particles that can be used as vectors for transmission of said recombinant nucleic acid molecules, preferably DNA molecules, include particles based on adeno-associated virus, lentivirus for example a retrovirus-based vector such as based on Moloney Murine Leukemia Virus, Spleen-Focus Forming Virus, Myeloproliferative Sarcoma Virus, Murine Stem Cell Virus, or SFG gamma retrovirus (Rivière et al., 1995. PNAS 92:6733-6737), adenovirus, herpes simplex virus, poxvirus such as Modified Vaccinia Ankara (MVA: Mackowiak et al., 1999. Adv Vet Med 41:571-583; Cottingham et al., 2008. PLOS One 20: e1638) or canary poxvirus, arenavirus, measles virus, Newcastle Disease virus [Kortekaas et al., 2010. Vaccine 28:2271-2276) and/or bunyavirus such as Rift Valley fever virus (Wichgers Schreur et al., 2014. J Virol 88:10883-10893).

A preferred virus particle is based on poxvirus. Said virus particle preferably is a Modified Vaccinia Ankara (MVA)-based particle such as described in Cottingham et al., 2008. PLOS One 20: e1638). A preferred expression cassette in MVA comprises the MVA 13.5 promoter sequence, as is described in, for example, US20150299267. The expression cassette preferably is inserted into the TK-gene of the MVA (attenuated smallpox) vaccine vector by means of Bacterial Artificial Chromosome (BAC)-recombineering according to procedures known to a person skilled in the art.

Said virus particle preferably is produced in a eukaryotic cell. Said eukaryotic cell preferably is a cell that can easily be infected and/or transfected using standard methods known to the skilled person, such as, for example, yeast cells and chicken fibroblast cells. Said eukaryotic cell preferably is an insect cell or a mammalian cell. Suitable insect cells comprise, for example, ovarian *Spodoptera frugiperda* cells such as Sf9 and Sf21, Drosophila Schneider 2 cells and *Aedes albopictus* C6/36 cells. Suitable mammalian cells comprise, for example, Baby Hamster Kidney cells, Human Embryonic Kidney cells such as HEK293 and freestyle HEK293FTM cells (ThermoFisher Scientific), VERO cells, MDCK cells, CHO cells, HeLa and PER.C6 cells (Fallaux, F. J. et al. 1998. Hum Gene Ther 9:1909-1917). Preferred cells are Human Embryonic Kidney cells such as HEK293 and freestyle HEK293FTM cells.

In one embodiment, said viral particle further comprises a marker protein. Said marker protein allows identification of pigs that have received a virus particle according to the invention. Said marker protein allows to discriminate a vaccinated pig from a pig that is infected with wild type ASFV. Said marker protein preferably is a fluorescent protein, beta-glucuronidase, beta-galactosidase, Gaussia luciferase, Renilla luciferase and/or secreted alkaline phosphatase. It will be understood by a person skilled in the art that the coding sequence for said marker protein is present in the genome of a virus particle according to the invention such that the marker protein is expressed in cell that have received a virus particle of the invention.

The invention further provides a set of viral particles comprising B-cell antigens of African Swine Fever Virus.

The invention further provides a set of viral particles comprising a viral particle comprising the recombinant molecule of any one of claims 1-5, and one or more viral particles comprising B-cell antigens of African Swine Fever Virus, preferably selected from proteins p30, p54, p72, EP402R, A104R and/or B602L of African Swine Fever Virus.

The invention further provides a kit of parts, comprising viral particles comprising B-cell antigens of African Swine Fever Virus.

Said B-cell antigens preferably are selected from proteins p30, p54, p72, EP402R, A104R and/or B602L of African Swine Fever Virus. Said B-cell antigens preferably comprise an amino acid sequence of proteins p30, p54, p72, EP402R, A104R and/or B602L of African Swine Fever Virus, preferably comprise substantially complete amino acid sequences of proteins p30, p54, p72, EP402R, A104R and/or B602L of African Swine Fever Virus. Examples of such amino acid sequences are provided by UniProt accession number P34204 (P30_ASFB7) for phosphoprotein p30 from strain Badajoz 1971: UniProt accession number Q65194 for envelope protein p54 from strain Badajoz 1971: UniProt accession number P22776 for major capsid protein p70 from strain Badajoz 1971: UniProt accession number Q89501 for the CD2 homolog EP402R from strain Badajoz 1971: UniProt accession number P68742 for viral histone-like protein A104R from strain Badajoz 1971; and UniProt accession number Q65169 for protein B602L from strain Badajoz 1971.

The invention further provides a kit of parts, comprising a viral particle, comprising the recombinant molecule comprising an expression cassette encoding a polyepitope comprising T-cell antigens from proteins of African Swine Fever Virus according to the invention and one or more viral particles comprising B-cell antigens of African Swine Fever Virus, preferably selected from proteins p30, p54, p72, EP402R, A104R and/or B602L of African Swine Fever Virus according to the invention.

The invention further provides a kit of parts comprising a viral particle, comprising the recombinant molecule comprising an expression cassette encoding a polyepitope comprising T-cell antigens from proteins of African Swine Fever Virus according to the invention and synthetic T-cell antigens from proteins of African Swine Fever Virus.

4.4 Methods of Stimulating an Immune Response in a Pig

The invention provides a method of stimulating an immune response in a pig comprising administering the recombinant molecule of the invention, and/or a viral particle of the invention, to the pig in an amount effective to induce an immune response.

The invention provides a method of stimulating an immune response in a pig comprising administering the recombinant molecule of any one of claims 1-5, and/or the viral particle of claim 6 or 7, in combination with a viral particle comprising B-cell antigens of African Swine Fever Virus, preferably selected from proteins p30, p54, p72, EP402R, A104R and/or B602L of African Swine Fever Virus, to the pig in an amount effective to induce an immune response.

The recombinant molecule of the invention, and/or a viral particle of the invention preferably is provided in a composition, preferably a pharmaceutical composition.

The recombinant nucleic acid molecule and/or virus particle may be administered to a pig by any method known to a person skilled in the art, including injection, patches for topical passive diffusion or iontophoresis, electroporation, thermal microporation, nasal sprayers, aerosol upper-respiratory and pulmonary inhalation, sonoporation, chemicals, and mechanical abrasion, and kinetic/ballistic delivery [Weniger et al., 2018. Vaccine 36:427-437].

Preferably a recombinant nucleic acid molecule and/or virus particle is/are administered parenterally, such as by injection. The recombinant nucleic acid molecule and/or viral particle according to the invention is preferably formulated with conventional, non-toxic pharmaceutically-acceptable carriers, adjuvants or vehicles. The term parenteral, as used herein, includes subcutaneous, intracutaneous or intradermally, intravenous, intramuscular, intra-articular, intrasynovial, intrasternal, intrathecal, intralesional and intracranial injection or infusion techniques.

The recombinant nucleic acid molecule according to the invention is more preferably administered by electroporation, more preferably by intramuscular/intradermal electroporation, to pigs. Electroporation may be performed using, for example, an electrode array consisting of an array of gold-plated trocar needle of 0.43 mm diameter at a 1.5 mm spacing (Inovio Pharmaceuticals, Plymouth Meeting, PA) which is pressed down on the skin bleb made by Mantoux delivery of 50 µl plasmid formulation and applying 100 ms pulses of 25 V: a portable pulse generator (CUY21 EDIT: Nepa Gene, Ichikawa, Japan) and tweezer electrodes (6 pulses of 10 msec with output current 300-600 mA): a BTX ECM 830 pulse generator with the needle-free micropatch round electrode mounted on a handle (Model MP 35) (Genetronics, San Diego, CA) and applying six square-wave pulses at 60, 70, or 80 V, respectively, with pulse duration of 60 ms, pulse interval of 200 ms, and reversal of polarity after three pulses.

A further preferred method employs intramuscular administration in the right thigh in two sites about three cm apart in a volume of 0.25 mL per injection site. Immediately after injection, an in vivo electroporation procedure using a Cliniporator (IGEA) may be applied with linear/hexagonal needle electrodes at the site of injections. The space between the needles preferably is about 2 cm and the electroporator is preferably set to 100V. A current of 50 V/cm is used to maintain an average amperage of 0.6 A. Two to twenty pulses, preferably five to ten pulses, preferably about eight pulses, of about 5-50 milliseconds, preferably about 20 milliseconds, are applied with intervals of 50-500 milliseconds, preferably about 200 milliseconds.

Said administration preferably is repeated, preferably 1-3 times such that the recombinant molecule and/or the viral particle is administered a total of 2-4 times. Repeated administration preferably is performed with intervals of about 2 weeks.

Protective immune response may require both cellular and serological immunity. Therefore, in a preferred method of stimulating an immune response in a pig, at least one of the administrations of the recombinant molecule and/or the viral particle is combined with administration of synthetic peptides comprising T-cell antigens from proteins of African Swine Fever Virus, preferably 2-50 peptides, more preferably about 10-30 peptides such as about 20 peptides such as 18 peptides, 19 peptides, 20 peptides, and 21 peptides.

Said peptides comprising T-cell antigens preferably are peptides of 6-15 amino acid residues, preferably 8 and 11 amino acid residues, more preferred about 9 amino acid residues. Preferred peptides are selected from the peptides indicated in Table 1.

Said peptides preferably are administered parenterally, such as by injection, more preferably by intramuscular injection.

In a preferred method of stimulating an immune response in a pig, at least one of the administrations of the recombinant molecule and/or the viral particle is combined with administration of a viral particle comprising B-cell antigens of African Swine Fever Virus, preferably selected from proteins p30, p54, p72, EP402R, A104R and/or B602L of African Swine Fever Virus.

The amount of a viral particle of the invention that is administered to a pig is, in general, in the range of 1,000 to 1,000,000,000 infectious virus particles per animal. The amount of infectious particles can be determined using standard techniques known to the skilled person such as, for example, a dose response curve.

The invention further provides a composition, preferably a veterinary acceptable composition, comprising the recombinant molecule and/or the viral particle of the invention, and a veterinary acceptable excipient.

Said composition preferably is an aqueous or oleaginous suspension. This suspension may be formulated according to techniques known in the art using suitable dispersing or wetting agents (such as, for example, TWEEN® 80) (a polysorbate surfactant)) and suspending agents. Among the acceptable vehicles and solvents that may be employed are mannitol, water. Ringer's solution and isotonic sodium chloride solution. In addition, sterile, fixed oils are conventionally employed as a solvent or suspending medium. For this purpose, any bland fixed oil may be employed including synthetic mono- or diglycerides. Fatty acids, such as oleic acid and its glyceride derivatives are useful in the preparation of a suitable composition, as are natural pharmaceutically-acceptable oils, such as olive oil or castor oil, especially in their polyoxyethylated versions. These oil solutions or suspensions may also contain a long-chain alcohol diluent or dispersant, or a similar alcohol as described in the Pharmacopoea Helvetica.

The invention further provides a vaccine comprising an effective immunizing amount of the composition comprising the recombinant molecule and/or the viral particle of the invention, and a veterinary acceptable excipient. Said vaccine preferably further comprises a viral particle comprising B-cell antigens of African Swine Fever Virus, preferably selected from proteins p30, p54, p72, EP402R, A104R and/or B602L of African Swine Fever Virus.

A composition comprising a viral particle of the invention preferably further comprises adjuvants including cytokines such as interferon-gamma, immunostimulatory nucleic acid sequences such as CpG oligonucleotides, liposomes, virus-like particles, surfactants such as hexadecylamine, polyanions such as pyran and dextran sulfate.

A preferred adjuvant is ISCOM, as described in the international patent application WO2002026255A1. ISCOM technology has several advantages over other adjuvants. ISCOMs stimulate both humoral and cell-mediated immune responses. ISCOMs is a highly efficient adjuvant, enabling further reduction of the amounts of an inactivated or part thereof according to the invention. A preferred ISCOM is ISCOM Matrix-M.

Another preferred adjuvant is BLP. BLPs are self-adjuvanting vaccine delivery vehicles, derived from inactivated *Lactococcus lactis* bacteria. *L. lactis* is a safe bacterium commonly used in the food industry, such as for the production of cheese and probiotic drinks. BLPs are produced by a simple hot acid treatment, resulting in a robust cell shaped matrix that predominantly consists of a peptidoglycan surface. Said peptidoglycan preferably comprises the C-terminal peptidoglycan binding domain LysM of *Lactococcus lactis* cell wall hydrolase AcmA as described in WO 2010/033031. This surface induces a long-lasting immunity needed for protection against disease causing pathogens. The non-living nature of BLP particles allows for accurate dosing without a risk of dissemination.

The BLPs also provide a safe and versatile backbone that can be efficiently loaded with particular antigens of choice, for example one or more viral particles of the invention comprising T-cell antigens and/or B-cell antigens of African Swin Fever Virus. Complete loading of BLPs with antigens is achieved by using a non-covalent coupling technology as is described in WO2010/033031. This technology allows for simple mixing of the antigen fusion with the BLPs, thereby resulting in robust and immediate binding of the antigen to the surface of the particles. The resulting antigen-covered BLPs is preferably delivered to a pig via the mucosal layers of the nose (spray) or mouth (capsule), without a need for an injection.

The invention further provides a method for preventing or ameliorating infection and/or spread of African Swine Fever Virus in pigs, comprising administering the recombinant molecule comprising an expression cassette encoding a polyepitope comprising T-cell antigens from proteins of African Swine Fever Virus, and/or a viral particle comprising said recombinant molecule, to at least one pig. Said administration of the recombinant molecule and/or the viral particle preferably is combined with administration of a viral particle comprising B-cell antigens of African Swine Fever Virus, preferably selected from proteins p30, p54, p72, EP402R, A104R and/or B602L of African Swine Fever Virus.

Said method provides protection against a subsequent infection with a wild type, virulent African Swine Fever Virus. Protection is defined as survival and absence of clinical manifestations of the disease, and a reduction of onward spread of wild type virus by any transmission route, including horizontal and vertical spread. The time to onset of protection and long lasting protection are part of the efficacy of a vaccine. Further, broad protection against different virus species or serotypes is also part of efficacy of a vaccine according to the invention.

The invention further provides a viral particle comprising T-cell antigens, preferably comprising an expression cassette encoding a polyepitope comprising T-cell antigens from proteins of African Swine Fever Virus, or B-cell antigens of African Swine Fever Virus, or a set of viral particles comprising T-cell antigens and B-cell antigens of African Swine Fever Virus, for use in a method of protecting a pig from subsequent infection with African Swine Fever Virus.

The invention further provides a kit of parts comprising viral particles comprising T-cell antigens, preferably comprising an expression cassette encoding a polyepitope comprising T-cell antigens from proteins of African Swine Fever Virus, and B-cell antigens of African Swine Fever Virus, for use in a method of protecting a pig from subsequent infection with African Swine Fever Virus.

For the purpose of clarity and a concise description, features are described herein as part of the same or separate embodiments, however, it will be appreciated that the scope of the invention may include embodiments having combinations of all or some of the features described.

5 EXAMPLES

Example 1: DNA Vaccination Based on Expression of ASFV T-Cell Epitopes

Method

Based on the complete genome sequences of known ASF isolates and the genome sequence of the pig, the epitope prediction program NetMHCpan was used to provide a list of T-cell epitopes that are independent of virus strain or pig breed (see Table 1). The nineteen top ranked T-cell epitopes were used to generate a poly-epitope synthetic DNA vaccine. The DNA sequence encoded 19 nonapeptide epitopes, separated by spacers of 3 to 5 amino acids that contain signals for proteasome cleavage and further processing (See FIG. 1A). Epitope 14 was not used since it would probably interfere with correct processing. Also a so-called PADRE universal T-cell epitope sequence was included for this purpose (See FIG. 1B). In order to enhance proteasomal degradation, the nucleotide sequence for ubiquitin was added at the 5'-terminal end of the synthetic gene. This leads to more efficient degradation by the proteasome and improved presentation of the epitopes to host T-cells. Finally a CpG adjuvant sequence was added to the 3'UTR of the synthetic gene. A codon-optimized version of the synthetic gene was chemically synthesized by GenScript Corporation and cloned behind the CMV promoter in plasmid pCVI (a derivative of pCI-neo [Promega] obtained by deleting a ClaI-restriction fragment) using the NheI and NotI restriction sites. The resulting plasmid was named pCVI-ASFD-VAC2.

Three groups of 6 pigs each were used for a vaccination-challenge study. The animals from group 1 were vaccinated three times with pCVI-ASFDVAC2. The animals from group 2 were also vaccinated three times but simultaneous with the 3rd DNA vaccination they also received a booster with a mixture of synthetic nonapeptides corresponding to the T-cell epitopes of the synthetic gene. The animals from the control group (group 3) were vaccinated three times with the empty plasmid pCVI. Pigs were vaccinated with intervals of 2 weeks. The vaccine was applied intramuscular/intradermal by immuno-electroporation using a cliniporator device (IGEA Clinical Biophysics, Carpi, Italy). The electric pulses generated by the electroporation apparatus improve the uptake of DNA by the surrounding tissue. The peptides were applied by intramuscular vaccination. Two weeks after the final vaccination, pigs were challenged with the ASFV Netherlands '86 strain (Wageningen Bioveterinary Research, The Netherlands: see Terpstra and Wensvoort, 1986. Tijdschrift voor diergeneeskunde 111:389-392). The strain was grown in porcine alveolar macrophages. Infected pigs were followed for 2 more than weeks for clinical symptoms. Virus levels in blood were determined by means of PCR. Antibody responses were examined by ELISA using whole virus as antigen. The levels of IFN-γ secreting cells were determined by ELISPOT after in vitro stimulation with virus or the cocktail of twenty nonapeptides.

Results

Figure 2B:
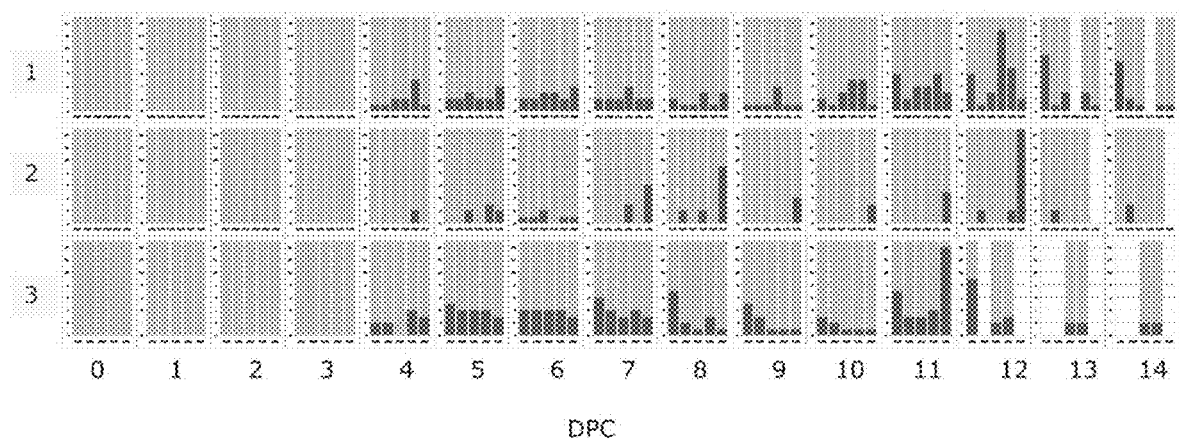
Figure 2C:
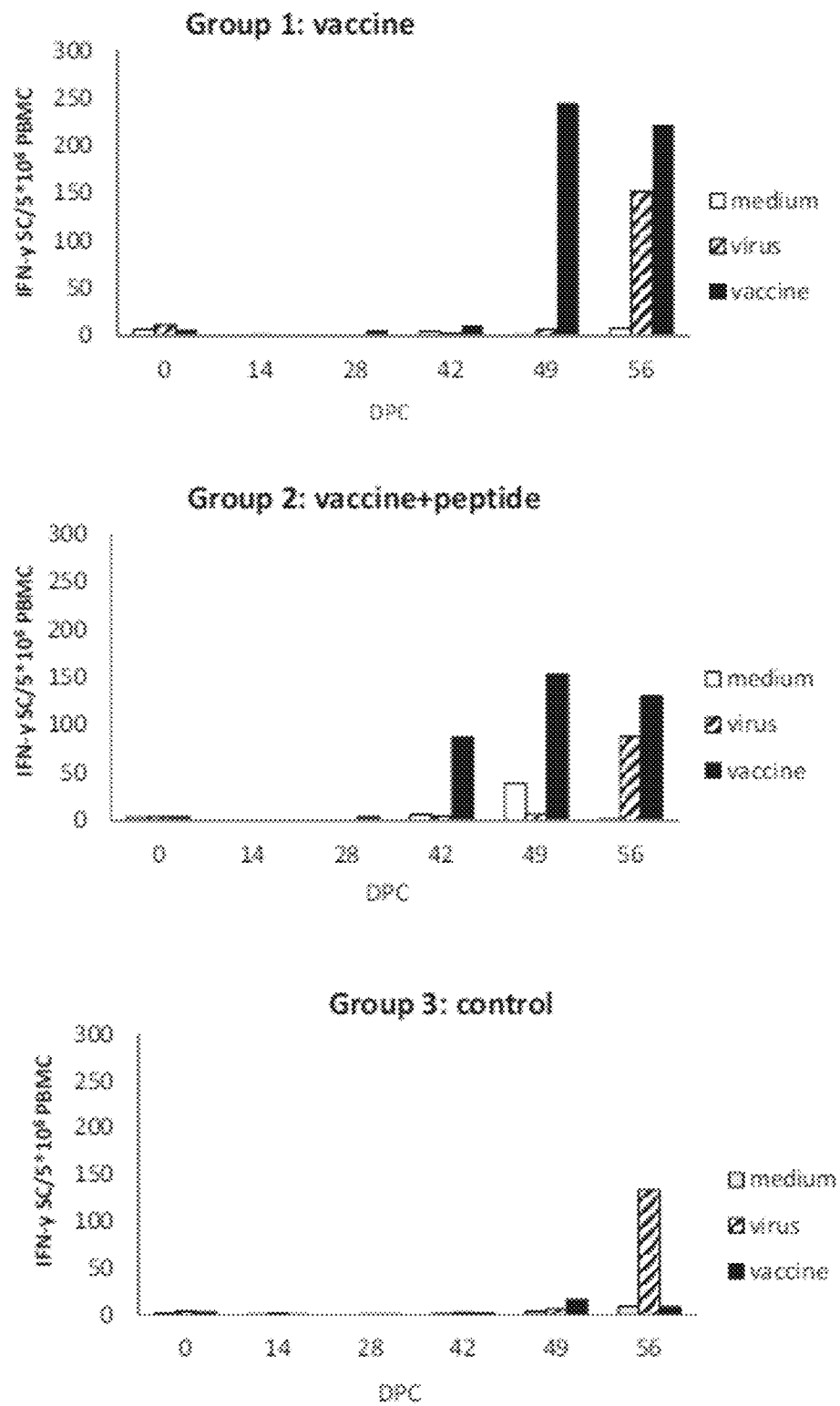

Challenge infection of the non-vaccinated control group (group 3) resulted in 40% survival. Vaccination resulted in about 83% survival in groups 1 and 2 (see FIG. 2A). Pigs in group 2 had significant lower total clinical scores than pigs in the other groups (FIG. 2B). Pigs in this group also had a significant IFN-γ secreting cell response against the cocktail of nonapeptides from day 42 post first vaccination (p.v.) (day 0 of challenge [p.c.]) until the end of the experiment (see FIG. 2C). Pigs in group 2 had a significant IFN-γ secreting cell response against the cocktail of nonapeptides from day 49 p.v. (day 7 p.c.). No IFN-γ secreting cell response against the cocktail of nonapeptides was observed in the control group. All groups showed a significant IFN-γ secreting cell response against the virus on day 56 p.v. (day 14 p.c.) There were no significant differences in levels of viral DNA in blood between groups. No significant differences were observed in levels of blocking percentage of the ASF antibody ELISA.

Example 2: Vaccination Using MVA Vectors Expressing ASFV T- and B-Cell Epitopes

Method

Based on the promising results of the poly-epitope DNA vaccine, the synthetic ASFDVAC2 gene was provided with the MVA 13.5 promoter sequence and inserted into the TK-gene of the MVA (attenuated smallpox) vaccine vector by means of BAC-recombineering according published procedures (Cottingham, 2012. Methods Mol Biol 890:37-57). The resulting virus was named MVA-VAC2. The insert of MVA-VAC2 comprises, from 5'end, a left flank of TK, the MVA 13.5L promoter, a Kozak sequence, the synthetic ASFDVAC2 gene, termination sequences from mH5, and the right flank of TK.

In addition, BAC recombineering was used to insert the genes encoding six well known major ASFV B-cell antigens (p30, p54, p72, EP402R, A104R and B602L) into the MVA vector using tandem (p30+B602L; p72+A104R) or triple (p54+EP402R+K205R) gene expression cassettes (MVA-p30/B602L, MVA-p72/A104R and MVA-p54/EP402R/K205R, respectively. To this end synthetic DNA constructs were generated (GenScript) and the protein-coding regions were provided with different MVA promoter and transcription-termination sequences to drive expression of these genes. Furthermore, in order to allow the detection of protein expression, each of the protein coding regions was provided with a C-terminal FLAG®-tag sequence.

Three groups of 10 pigs each were used for a vaccination-challenge experiment. The animals from group 1 were vaccinated twice intramuscularly using 10^8 TCID50 MVA-VAC2. The animals from group 2 were vaccinated twice with a combination of all 4 MVA-recombinants expressing T-cell epitopes and B-cell epitopes (10^8 TCID50 each). The non-vaccinated animals from group 3 served as controls. Two weeks after the second vaccination the animals were challenged with the ASFV Netherlands '86 strain.

Results

Figure 3A:
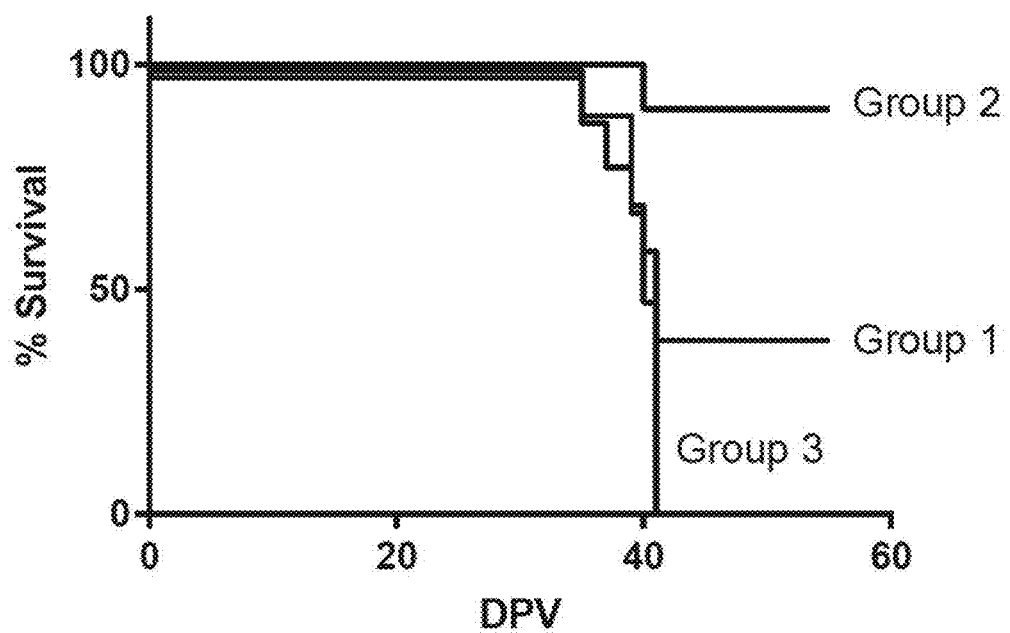
Figure 3B:
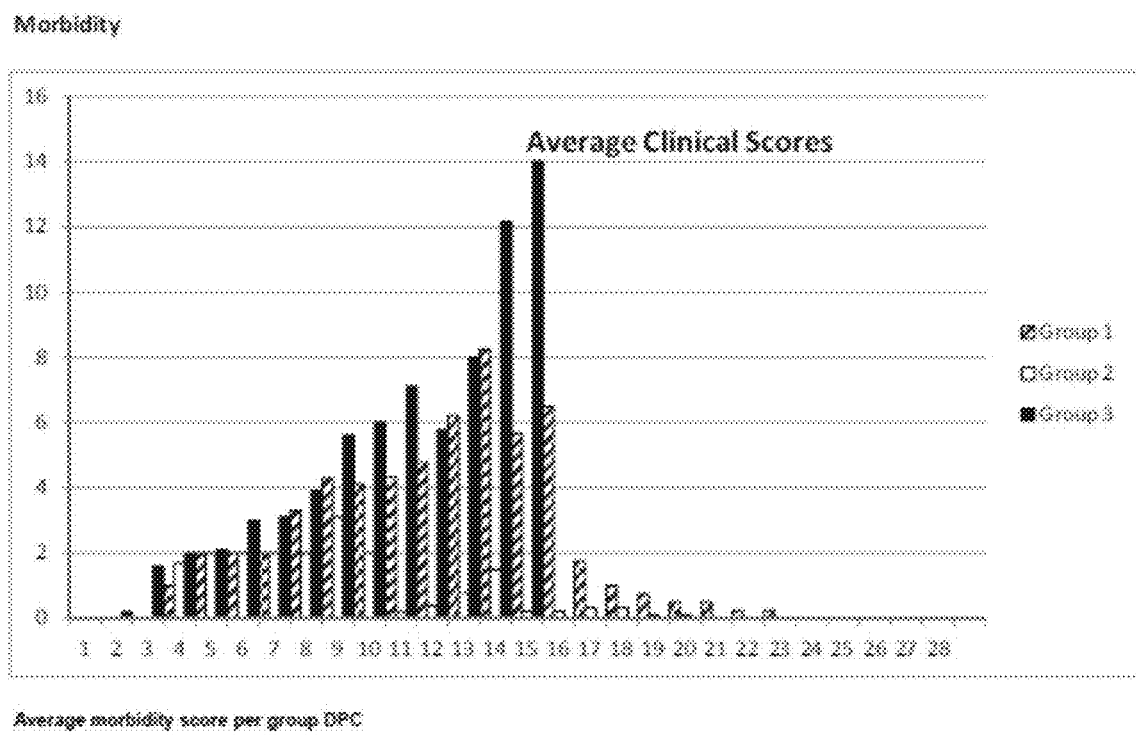
Figure 3C:
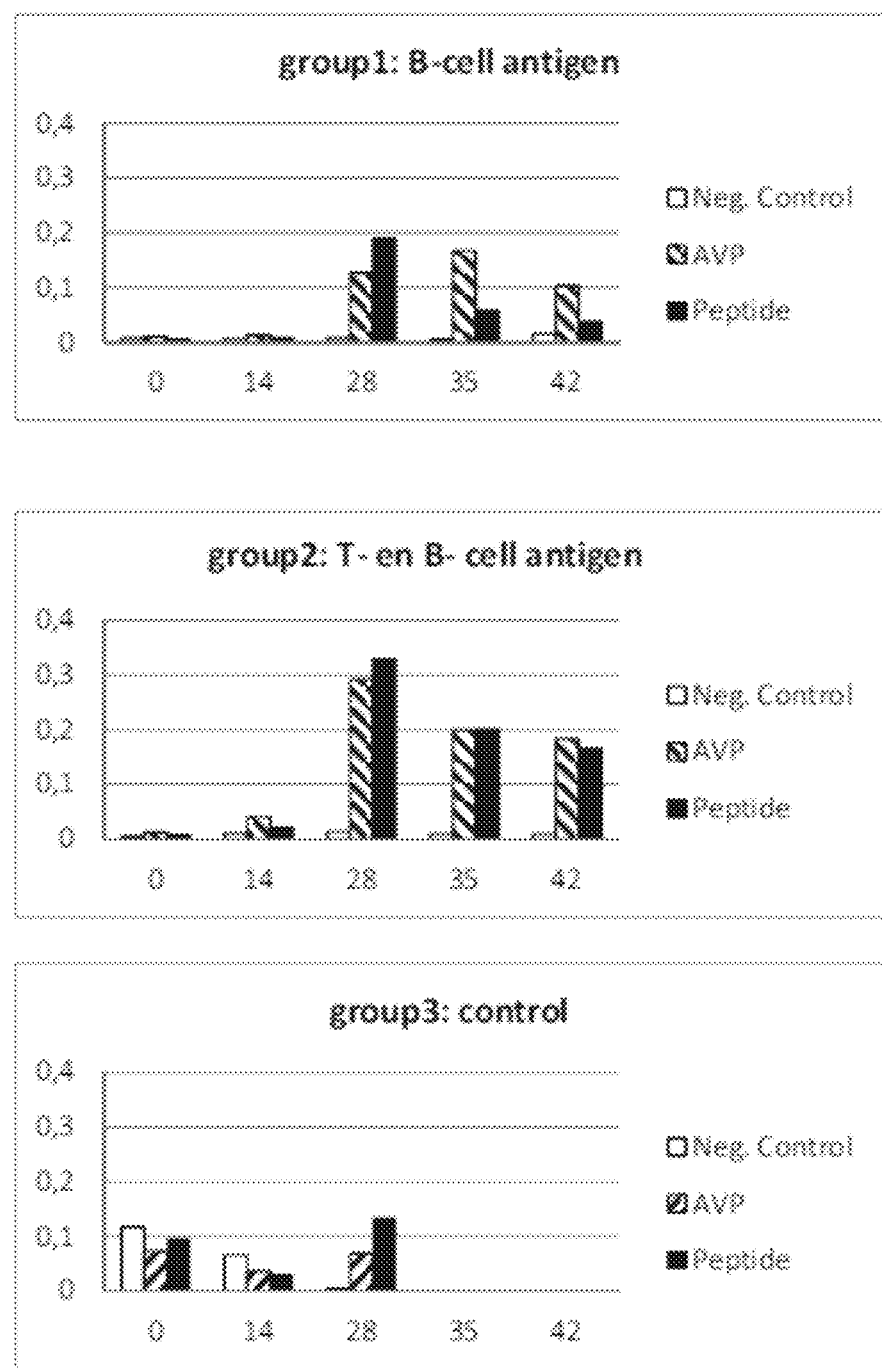

Challenge infection of non-vaccinated animals (group 3) resulted in 0% survival (see FIG. 3A). Remarkably 9 out of 10 pigs that were vaccinated with the combination of all 4 MVA-recombinants (group 2) survived and showed only mild morbidity for only a few days. In group 1 animals, which were vaccinated with MVA-VAC2 only, 4 pigs survived. The animals from this group showed more morbidity and over a longer period of time, when compared to the animals from group 2 (see FIG. 3B). These results correspond well with the cell-mediated immunity (CMI) as measured with IFN-γ secreting cell response against the cocktail of T-cell nonapeptide epitopes or whole ASFV antigen (FIG. 3C).

CONCLUSION

In this study promising results for the development of an ASFV vaccine were obtained by using a combination-vaccine consisting of MVA vector viruses that express ASFV T-cell as well as B-cell epitopes. The combination-vaccine provided protection against mortality and clinical disease after challenge.

SEQUENCE LISTING

<160> NUMBER OF SEQ ID NOS: 39

<210> SEQ ID NO 1
<211> LENGTH: 75
<212> TYPE: PRT
<213> ORGANISM: Artificial Sequence
<220> FEATURE:
<223> OTHER INFORMATION: ubiquitin

<400> SEQUENCE: 1

Met Gln Ile Phe Val Lys Thr Leu Thr Gly Lys Thr Ile Thr Leu Glu
1               5                   10                  15

Val Glu Pro Ser Asp Thr Ile Glu Asn Val Lys Ala Lys Ile Gln Asp
            20                  25                  30

Lys Glu Gly Ile Pro Pro Asp Gln Gln Arg Leu Ile Phe Ala Gly Lys
        35                  40                  45

Gln Leu Glu Asp Gly Arg Thr Leu Ser Asp Tyr Asn Ile Gln Lys Glu
    50                  55                  60

Ser Thr Leu His Leu Val Leu Arg Leu Arg Gly
65                  70                  75

<210> SEQ ID NO 2
<211> LENGTH: 8
<212> TYPE: PRT
<213> ORGANISM: Artificial Sequence
<220> FEATURE:
<223> OTHER INFORMATION: T-cell antigen

<400> SEQUENCE: 2

Thr Leu Asn Leu Leu Leu Ser Tyr
1               5

<210> SEQ ID NO 3
<211> LENGTH: 9
<212> TYPE: PRT
<213> ORGANISM: Artificial Sequence
<220> FEATURE:
<223> OTHER INFORMATION: T-cell antigen

<400> SEQUENCE: 3

Lys Thr Phe Cys Lys Asn Leu Pro Tyr
1               5

<210> SEQ ID NO 4
<211> LENGTH: 9
<212> TYPE: PRT
<213> ORGANISM: Artificial Sequence
<220> FEATURE:
<223> OTHER INFORMATION: T-cell antigen

<400> SEQUENCE: 4

Met Ser Val Ser Thr Phe Trp Pro Tyr
1               5

<210> SEQ ID NO 5
<211> LENGTH: 9
<212> TYPE: PRT
<213> ORGANISM: Artificial Sequence
<220> FEATURE:
<223> OTHER INFORMATION: T-cell antigen

<400> SEQUENCE: 5

Arg Ile Asn Arg Asn Tyr Tyr Pro Tyr
1               5

<210> SEQ ID NO 6
<211> LENGTH: 9
<212> TYPE: PRT
<213> ORGANISM: Artificial Sequence
<220> FEATURE:
<223> OTHER INFORMATION: T-cell antigen

<400> SEQUENCE: 6

Ile Thr Tyr Leu Asn Asn Met Gly Tyr
1               5

<210> SEQ ID NO 7
<211> LENGTH: 9
<212> TYPE: PRT
<213> ORGANISM: Artificial Sequence
<220> FEATURE:
<223> OTHER INFORMATION: T-cell antigen

<400> SEQUENCE: 7

Arg Thr Ala Ser Ser Ala Glu Leu Tyr
1               5

<210> SEQ ID NO 8
<211> LENGTH: 9
<212> TYPE: PRT
<213> ORGANISM: Artificial Sequence
<220> FEATURE:
<223> OTHER INFORMATION: T-cell antigen

<400> SEQUENCE: 8

Ala Thr Gln Gln Leu Ala Leu Asn Tyr
1               5

<210> SEQ ID NO 9
<211> LENGTH: 9
<212> TYPE: PRT
<213> ORGANISM: Artificial Sequence
<220> FEATURE:
<223> OTHER INFORMATION: T-cell antigen

<400> SEQUENCE: 9

Ser Ile Ile Thr Arg His Leu Glu Tyr
1               5

<210> SEQ ID NO 10
<211> LENGTH: 9
<212> TYPE: PRT
<213> ORGANISM: Artificial Sequence
<220> FEATURE:
<223> OTHER INFORMATION: T-cell antigen

<400> SEQUENCE: 10

Lys Thr Phe Ser Asp Leu Ser Asn Tyr
1               5

<210> SEQ ID NO 11
<211> LENGTH: 9
<212> TYPE: PRT
<213> ORGANISM: Artificial Sequence
<220> FEATURE:
<223> OTHER INFORMATION: T-cell antigen

<400> SEQUENCE: 11

Tyr Arg Phe Val Trp Tyr Gln Pro Phe
1               5

<210> SEQ ID NO 12
<211> LENGTH: 9
<212> TYPE: PRT
<213> ORGANISM: Artificial Sequence
<220> FEATURE:
<223> OTHER INFORMATION: T-cell antigen

<400> SEQUENCE: 12

Tyr Thr Leu Asn His Ala Phe Thr Leu
1               5

<210> SEQ ID NO 13
<211> LENGTH: 9
<212> TYPE: PRT
<213> ORGANISM: Artificial Sequence
<220> FEATURE:
<223> OTHER INFORMATION: T-cell antigen

<400> SEQUENCE: 13

Ser Met Ser Leu Asn Tyr Tyr Phe Tyr
1               5

<210> SEQ ID NO 14
<211> LENGTH: 9
<212> TYPE: PRT
<213> ORGANISM: Artificial Sequence
<220> FEATURE:
<223> OTHER INFORMATION: T-cell antigen

<400> SEQUENCE: 14

Phe Ile Asn Ser Thr Asp Phe Leu Tyr
1               5

<210> SEQ ID NO 15
<211> LENGTH: 9
<212> TYPE: PRT
<213> ORGANISM: Artificial Sequence
<220> FEATURE:
<223> OTHER INFORMATION: T-cell antigen

<400> SEQUENCE: 15

Tyr Tyr Tyr Gly Tyr Tyr Tyr Gln Leu
1               5

<210> SEQ ID NO 16
<211> LENGTH: 9
<212> TYPE: PRT
<213> ORGANISM: Artificial Sequence
<220> FEATURE:
<223> OTHER INFORMATION: T-cell antigen

<400> SEQUENCE: 16

Ala Ile Asn Thr Phe Met Tyr Tyr Tyr
1               5

<210> SEQ ID NO 17
<211> LENGTH: 9
<212> TYPE: PRT
<213> ORGANISM: Artificial Sequence
<220> FEATURE:
<223> OTHER INFORMATION: T-cell antigen

<400> SEQUENCE: 17

Tyr Gln Leu Asp Leu Phe Thr Ala Leu
1               5

<210> SEQ ID NO 18
<211> LENGTH: 9
<212> TYPE: PRT
<213> ORGANISM: Artificial Sequence
<220> FEATURE:
<223> OTHER INFORMATION: T-cell antigen

<400> SEQUENCE: 18

Cys Ile Asp Leu Gly Ala Asn Ala Phe

```
1               5

<210> SEQ ID NO 19
<211> LENGTH: 9
<212> TYPE: PRT
<213> ORGANISM: Artificial Sequence
<220> FEATURE:
<223> OTHER INFORMATION: T-cell antigen

<400> SEQUENCE: 19

Phe Ser Phe Gly Arg Thr Leu Val Tyr
1               5

<210> SEQ ID NO 20
<211> LENGTH: 9
<212> TYPE: PRT
<213> ORGANISM: Artificial Sequence
<220> FEATURE:
<223> OTHER INFORMATION: T-cell antigen

<400> SEQUENCE: 20

Ser Ser Met Asp Asp Ile Ser Ala Tyr
1               5

<210> SEQ ID NO 21
<211> LENGTH: 9
<212> TYPE: PRT
<213> ORGANISM: Artificial Sequence
<220> FEATURE:
<223> OTHER INFORMATION: T-cell antigen

<400> SEQUENCE: 21

Cys Ile Asp Leu Gly Ala Asp Ala Phe
1               5

<210> SEQ ID NO 22
<211> LENGTH: 5
<212> TYPE: PRT
<213> ORGANISM: Artificial Sequence
<220> FEATURE:
<223> OTHER INFORMATION: Spacer sequence

<400> SEQUENCE: 22

Ala Asp Arg Arg Phe
1               5

<210> SEQ ID NO 23
<211> LENGTH: 5
<212> TYPE: PRT
<213> ORGANISM: Artificial Sequence
<220> FEATURE:
<223> OTHER INFORMATION: Spacer sequence

<400> SEQUENCE: 23

Ala Asp Ala Gln Trp
1               5

<210> SEQ ID NO 24
<211> LENGTH: 5
<212> TYPE: PRT
<213> ORGANISM: Artificial Sequence
<220> FEATURE:
<223> OTHER INFORMATION: Spacer sequence

<400> SEQUENCE: 24

Ala Asp Ala Arg Trp
1               5
```

```
<210> SEQ ID NO 25
<211> LENGTH: 5
<212> TYPE: PRT
<213> ORGANISM: Artificial Sequence
<220> FEATURE:
<223> OTHER INFORMATION: Spacer sequence

<400> SEQUENCE: 25

Ala Asp Arg Arg Tyr
1               5

<210> SEQ ID NO 26
<211> LENGTH: 5
<212> TYPE: PRT
<213> ORGANISM: Artificial Sequence
<220> FEATURE:
<223> OTHER INFORMATION: Spacer sequence

<400> SEQUENCE: 26

Ala Asp Asn Gln Phe
1               5

<210> SEQ ID NO 27
<211> LENGTH: 5
<212> TYPE: PRT
<213> ORGANISM: Artificial Sequence
<220> FEATURE:
<223> OTHER INFORMATION: Spacer sequence

<400> SEQUENCE: 27

Ala Asp Arg Ile Trp
1               5

<210> SEQ ID NO 28
<211> LENGTH: 5
<212> TYPE: PRT
<213> ORGANISM: Artificial Sequence
<220> FEATURE:
<223> OTHER INFORMATION: Spacer sequence

<400> SEQUENCE: 28

Ala Asp Ala Arg Tyr
1               5

<210> SEQ ID NO 29
<211> LENGTH: 15
<212> TYPE: PRT
<213> ORGANISM: Artificial Sequence
<220> FEATURE:
<223> OTHER INFORMATION: non-natural pan DR epitope (PADRE)
<220> FEATURE:
<221> NAME/KEY: MOD_RES
<222> LOCATION: (3)..(3)
<223> OTHER INFORMATION: residue is L-cyclohexylalanine
<220> FEATURE:
<221> NAME/KEY: MOD_RES
<222> LOCATION: (13)..(13)
<223> OTHER INFORMATION: residue is L-cyclohexylalanine
<220> FEATURE:
<221> NAME/KEY: MOD_RES
<222> LOCATION: (14)..(14)
<223> OTHER INFORMATION: residue is aminocaproic acid

<400> SEQUENCE: 29

Ala Lys Xaa Val Ala Ala Trp Thr Leu Lys Ala Ala Ala Xaa Cys
1               5                   10                  15
```

```
<210> SEQ ID NO 30
<211> LENGTH: 16
<212> TYPE: PRT
<213> ORGANISM: Artificial Sequence
<220> FEATURE:
<223> OTHER INFORMATION: derived from non-natural pan DR epitope (PADRE)

<400> SEQUENCE: 30

Ala Lys Phe Val Ala Ala Trp Thr Leu Lys Ala Ala Ala Ala Arg Tyr
1               5                   10                  15

<210> SEQ ID NO 31
<211> LENGTH: 10
<212> TYPE: PRT
<213> ORGANISM: Artificial Sequence
<220> FEATURE:
<223> OTHER INFORMATION: c-myc domain tag

<400> SEQUENCE: 31

Glu Gln Lys Leu Ile Ser Glu Glu Asp Leu
1               5                   10

<210> SEQ ID NO 32
<211> LENGTH: 9
<212> TYPE: PRT
<213> ORGANISM: Artificial Sequence
<220> FEATURE:
<223> OTHER INFORMATION: hemagglutinin tag

<400> SEQUENCE: 32

Tyr Pro Tyr Asp Val Pro Asp Tyr Ala
1               5

<210> SEQ ID NO 33
<211> LENGTH: 1081
<212> TYPE: DNA
<213> ORGANISM: Artificial Sequence
<220> FEATURE:
<223> OTHER INFORMATION: Insert of ASFDVAC2
<220> FEATURE:
<221> NAME/KEY: CDS
<222> LOCATION: (16)..(1032

```
tgc aaa aac ctg cct tat gca aga tac atg tca gtg tca acc ttc tgg         387
Cys Lys Asn Leu Pro Tyr Ala Arg Tyr Met Ser Val Ser Thr Phe Trp
110                 115                 120 ccc tat gcc gac gcc aga tgg aga atc aac aga aac tac tac cca tac         435
Pro Tyr Ala Asp Ala Arg Trp Arg Ile Asn Arg Asn Tyr Tyr Pro Tyr
125                 130                 135                 140 gca gat aac cag ttc att aca tac ctg aac aac atg gga tat gca aga         483
Ala Asp Asn Gln Phe Ile Thr Tyr Leu Asn Asn Met Gly Tyr Ala Arg
            145                 150                 155 tac aga acc gca tca tca gcc gaa ctg tac gca gac aga att tgg gca         531
Tyr Arg Thr Ala Ser Ser Ala Glu Leu Tyr Ala Asp Arg Ile Trp Ala
        160                 165                 170 aca cag cag ctg gca ctg aac tat gca gat gcc aga tac tca atc att         579
Thr Gln Gln Leu Ala Leu Asn Tyr Ala Asp Ala Arg Tyr Ser Ile Ile
    175                 180                 185 aca aga cac ctg gag tat gca aga tac aag acc ttc tca gac ctg tca         627
Thr Arg His Leu Glu Tyr Ala Arg Tyr Lys Thr Phe Ser Asp Leu Ser
190                 195                 200 aac tat aat cag ttc tac aga ttc gtc tgg tac cag ccc ttc gca gac         675
Asn Tyr Asn Gln Phe Tyr Arg Phe Val Trp Tyr Gln Pro Phe Ala Asp
205                 210                 215                 220 aga aga ttc tca atg tca ctg aac tac tat ttc tac gca gac gcc cag         723
Arg Arg Phe Ser Met Ser Leu Asn Tyr Tyr Phe Tyr Ala Asp Ala Gln
            225                 230                 235 tgg ttc atc aat tca aca gat ttc ctg tac aga aga tgg gca att aac         771
Trp Phe Ile Asn Ser Thr Asp Phe Leu Tyr Arg Arg Trp Ala Ile Asn
        240                 245                 250 acc ttc atg tac tat tat gcc gat gcc aga tgg tac cag ctg gat ctg         819
Thr Phe Met Tyr Tyr Tyr Ala Asp Ala Arg Trp Tyr Gln Leu Asp Leu
    255                 260                 265 ttc aca gca ctg gcc gac gca aga tgg tgc atc gat ctg gga gcc aac         867
Phe Thr Ala Leu Ala Asp Ala Arg Trp Cys Ile Asp Leu Gly Ala Asn
270                 275                 280 gca ttc gcc gac gca aga tgg tca tca atg gac gat atc tca gcc tat         915
Ala Phe Ala Asp Ala Arg Trp Ser Ser Met Asp Asp Ile Ser Ala Tyr
285                 290                 295                 300 gca aga tac tgt att gac ctg ggg gcc gat gca ttc gcc cag tgg tac         963
Ala Arg Tyr Cys Ile Asp Leu Gly Ala Asp Ala Phe Ala Gln Trp Tyr
            305                 310                 315 acc ctg aat cac gca ttc aca ctg gca gat aga aga tat ttc tca ttc         1011
Thr Leu Asn His Ala Phe Thr Leu Ala Asp Arg Arg Tyr Phe Ser Phe
        320                 325                 330 gga aga acc ctg gtg tat tga taatcgtcgt ttgtcgtttt gtcgttggtg            1062
Gly Arg Thr Leu Val Tyr
            335 catcgatgca ggcggccgc                                                    1081

<210> SEQ ID NO 34
<211> LENGTH: 338
<212> TYPE: PRT
<213> ORGANISM: Artificial Sequence
<220> FEATURE:
<223> OTHER INFORMATION: Synthetic Construct

<400> SEQUENCE: 34

Met Gln Ile Phe Val Lys Thr Leu Thr Gly Lys Thr Ile Thr Leu Glu
1               5                   10                  15

Val Glu Pro Ser Asp Thr Ile Glu Asn Val Lys Ala Lys Ile Gln Asp
            20                  25                  30

Lys Glu Gly Ile Pro Pro Asp Gln Gln Arg Leu Ile Phe Ala Gly Lys
```

```
                     35                  40                  45
        Gln Leu Glu Asp Gly Arg Thr Leu Ser Asp Tyr Asn Ile Gln Lys Glu
         50                  55                  60

Ser Thr Leu His Leu Val Leu Arg Leu Arg Gly Ala Lys Phe Val Ala
         65                  70                  75                  80

Ala Trp Thr Leu Lys Ala Ala Ala Arg Tyr Lys Thr Leu Asn Leu
                         85                  90                  95

Leu Leu Ser Tyr Ala Asp Ala Arg Trp Lys Thr Phe Cys Lys Asn Leu
                        100                 105                 110

Pro Tyr Ala Arg Tyr Met Ser Val Ser Thr Phe Trp Pro Tyr Ala Asp
                        115                 120                 125

Ala Arg Trp Arg Ile Asn Arg Asn Tyr Tyr Pro Tyr Ala Asp Asn Gln
                        130                 135                 140

Phe Ile Thr Tyr Leu Asn Asn Met Gly Tyr Ala Arg Tyr Arg Thr Ala
        145                 150                 155                 160

Ser Ser Ala Glu Leu Tyr Ala Asp Arg Ile Trp Ala Thr Gln Gln Leu
                        165                 170                 175

Ala Leu Asn Tyr Ala Asp Ala Arg Tyr Ser Ile Ile Thr Arg His Leu
                        180                 185                 190

Glu Tyr Ala Arg Tyr Lys Thr Phe Ser Asp Leu Ser Asn Tyr Asn Gln
                        195                 200                 205

Phe Tyr Arg Phe Val Trp Tyr Gln Pro Phe Ala Asp Arg Arg Phe Ser
                        210                 215                 220

Met Ser Leu Asn Tyr Tyr Phe Tyr Ala Asp Ala Gln Trp Phe Ile Asn
        225                 230                 235                 240

Ser Thr Asp Phe Leu Tyr Arg Arg Trp Ala Ile Asn Thr Phe Met Tyr
                        245                 250                 255

Tyr Tyr Ala Asp Ala Arg Trp Tyr Gln Leu Asp Leu Phe Thr Ala Leu
                        260                 265                 270

Ala Asp Ala Arg Trp Cys Ile Asp Leu Gly Ala Asn Ala Phe Ala Asp
                        275                 280                 285

Ala Arg Trp Ser Ser Met Asp Asp Ile Ser Ala Tyr Ala Arg Tyr Cys
                        290                 295                 300

Ile Asp Leu Gly Ala Asp Ala Phe Ala Gln Trp Tyr Thr Leu Asn His
        305                 310                 315                 320

Ala Phe Thr Leu Ala Asp Arg Arg Tyr Phe Ser Phe Gly Arg Thr Leu
                        325                 330                 335

Val Tyr

<210> SEQ ID NO 35
<211> LENGTH: 338
<212> TYPE: PRT
<213> ORGANISM: Artificial Sequence
<220> FEATURE:
<223> OTHER INFORMATION: Insert of ASFDVAC2
<220> FEATURE:
<221> NAME/KEY: DOMAIN
<222> LOCATION: (1)..(75)
<223> OTHER INFORMATION: ubiquitin
<220> FEATURE:
<221> NAME/KEY: DOMAIN
<222> LOCATION: (76)..(88)
<223> OTHER INFORMATION: PADRE
<220> FEATURE:
<221> NAME/KEY: DOMAIN
<222> LOCATION: (92)..(100)
<223> OTHER INFORMATION: T-cell antigen
<220> FEATURE:
<221> NAME/KEY: DOMAIN
```

```
<222> LOCATION: (106)..(114)
<223> OTHER INFORMATION: T-cell antigen
<220> FEATURE:
<221> NAME/KEY: DOMAIN
<222> LOCATION: (118)..(126)
<223> OTHER INFORMATION: T-cell antigen
<220> FEATURE:
<221> NAME/KEY: DOMAIN
<222> LOCATION: (132)..(140)
<223> OTHER INFORMATION: T-cell antigen
<220> FEATURE:
<221> NAME/KEY: DOMAIN
<222> LOCATION: (146)..(154)
<223> OTHER INFORMATION: T-cell antigen
<220> FEATURE:
<221> NAME/KEY: DOMAIN
<222> LOCATION: (158)..(166)
<223> OTHER INFORMATION: T-cell antigen
<220> FEATURE:
<221> NAME/KEY: DOMAIN
<222> LOCATION: (172)..(180)
<223> OTHER INFORMATION: T-cell antigen
<220> FEATURE:
<221> NAME/KEY: DOMAIN
<222> LOCATION: (186)..(194)
<223> OTHER INFORMATION: T-cell antigen
<220> FEATURE:
<221> NAME/KEY: DOMAIN
<222> LOCATION: (198)..(206)
<223> OTHER INFORMATION: T-cell antigen
<220> FEATURE:
<221> NAME/KEY: DOMAIN
<222> LOCATION: (210)..(218)
<223> OTHER INFORMATION: T-cell antigen
<220> FEATURE:
<221> NAME/KEY: DOMAIN
<222> LOCATION: (224)..(232)
<223> OTHER INFORMATION: T-cell antigen
<220> FEATURE:
<221> NAME/KEY: DOMAIN
<222> LOCATION: (238)..(246)
<223> OTHER INFORMATION: T-cell antigen
<220> FEATURE:
<221> NAME/KEY: DOMAIN
<222> LOCATION: (250)..(258)
<223> OTHER INFORMATION: T-cell antigen
<220> FEATURE:
<221> NAME/KEY: DOMAIN
<222> LOCATION: (264)..(272)
<223> OTHER INFORMATION: T-cell antigen
<220> FEATURE:
<221> NAME/KEY: DOMAIN
<222> LOCATION: (278)..(286)
<223> OTHER INFORMATION: T-cell antigen
<220> FEATURE:
<221> NAME/KEY: DOMAIN
<222> LOCATION: (292)..(300)
<223> OTHER INFORMATION: T-cell antigen
<220> FEATURE:
<221> NAME/KEY: DOMAIN
<222> LOCATION: (304)..(312)
<223> OTHER INFORMATION: T-cell antigen
<220> FEATURE:
<221> NAME/KEY: DOMAIN
<222> LOCATION: (316)..(324)
<223> OTHER INFORMATION: T-cell antigen
<220> FEATURE:
<221> NAME/KEY: DOMAIN
<222> LOCATION: (330)..(338)
<223> OTHER INFORMATION: T-cell antigen

<400> SEQUENCE: 35

Met Gln Ile Phe Val Lys Thr Leu Thr Gly Lys Thr Ile Thr Leu Glu
1               5                   10                  15

Val Glu Pro Ser Asp Thr Ile Glu Asn Val Lys Ala Lys Ile Gln Asp
            20                  25                  30
```

Lys Glu Gly Ile Pro Pro Asp Gln Gln Arg Leu Ile Phe Ala Gly Lys
            35                  40                  45

Gln Leu Glu Asp Gly Arg Thr Leu Ser Asp Tyr Asn Ile Gln Lys Glu
 50                  55                  60

Ser Thr Leu His Leu Val Leu Arg Leu Arg Gly Ala Lys Phe Val Ala
 65                  70                  75                  80

Ala Trp Thr Leu Lys Ala Ala Ala Arg Tyr Lys Thr Leu Asn Leu
                 85                  90                  95

Leu Leu Ser Tyr Ala Asp Ala Arg Trp Lys Thr Phe Cys Lys Asn Leu
                100                 105                 110

Pro Tyr Ala Arg Tyr Met Ser Val Ser Thr Phe Trp Pro Tyr Ala Asp
                115                 120                 125

Ala Arg Trp Arg Ile Asn Arg Asn Tyr Tyr Pro Tyr Ala Asp Asn Gln
            130                 135                 140

Phe Ile Thr Tyr Leu Asn Asn Met Gly Tyr Ala Arg Tyr Arg Thr Ala
145                 150                 155                 160

Ser Ser Ala Glu Leu Tyr Ala Asp Arg Ile Trp Ala Thr Gln Gln Leu
                165                 170                 175

Ala Leu Asn Tyr Ala Asp Ala Arg Tyr Ser Ile Ile Thr Arg His Leu
                180                 185                 190

Glu Tyr Ala Arg Tyr Lys Thr Phe Ser Asp Leu Ser Asn Tyr Asn Gln
            195                 200                 205

Phe Tyr Arg Phe Val Trp Tyr Gln Pro Phe Ala Asp Arg Arg Phe Ser
210                 215                 220

Met Ser Leu Asn Tyr Tyr Phe Tyr Ala Asp Ala Gln Trp Phe Ile Asn
225                 230                 235                 240

Ser Thr Asp Phe Leu Tyr Arg Arg Trp Ala Ile Asn Thr Phe Met Tyr
                245                 250                 255

Tyr Tyr Ala Asp Ala Arg Trp Tyr Gln Leu Asp Leu Phe Thr Ala Leu
                260                 265                 270

Ala Asp Ala Arg Trp Cys Ile Asp Leu Gly Ala Asn Ala Phe Ala Asp
            275                 280                 285

Ala Arg Trp Ser Ser Met Asp Asp Ile Ser Ala Tyr Ala Arg Tyr Cys
290                 295                 300

Ile Asp Leu G

```
ttcaaaacgg atttaagatc atcttcacaa gttgtgtttc atgcgggtag cttgtataat    360
tggttttctg ttgagattat caatagcggt agaattgtta cgaccgctat aaaaacattg    420
ctcagtactg ttaagtatga tattgtgaaa tctgctcata tatatgcagg gcaagggtat    480
actgaacatc aggctcaaga agaatggaat atgattctgc atgtgctgtt tgaagaggag    540
acagaatcct cagcatcatc ggaaagcatt catgaaaaaa atgataatga aaccaatgaa    600
tgcacatcct cctttgaaac attgtttgag caagagccct catcagagga acctaaagac    660
tccaagctgt atatgcttgc acaaaagact gtgcaacata ttgaacaata tggaaaggca    720
cctgatttta acaaggttat tagagcacat aactttattc aaaccattca tggaaccccct   780
ctaaaggaag aagaaaaaga ggtggtaaga ctcatggtca ttaaactttt aaaaaaaaaa    840
gattacaagg acgatgacga taagtagtag gtttttatat aaaaaggcgc gccataaaaa    900
tttttatact agtgtaccgc ggtcgaatcg atttaattaa cgatgctagc attgtcgacg    960
gtggtggcgc ggccgcctcg agaaaaattg aaaataaata caaaggttct tgagggttgt   1020
gttaaattga aagcgagaaa taatcataaa taagccacca ccgtttgcca ccatggcaga   1080
atttaatatt gatgagcttc tcaaaaacgt attggaggat ccctctactg aaatatccga   1140
agaaacgctt aaacagcttt atcaaaggac gaacccttac aaacagttca aaaatgatag   1200
cagggtggcc ttttgctctt ttacaaattt gcgggagcag tatattcgac gtcttataat   1260
gactagcttt attggatatg tcttcaaagc tctgcaggaa tggatgcctt cctattcaaa   1320
acctacccac acgaccaaaa ctcttctcag tgagctaata acgttagttg atactttgaa   1380
acaggaaact aatgatgttc cctctgaatc ggtagtaaat acaattttat ctatagcgga   1440
tagctgcaaa acccagacgc agaaaagcaa ggaagctaaa acaacgatcg atagcttttt   1500
acgagaacat tttgtgtttg atcctaatct tcatgctcaa agtgcgtata cttgtgcaag   1560
cacttgtgca gataccaatg tagacacctg tgcaagcact tgtgcaagca cttgtgcaag   1620
cacttgtgca agcacttgtg caagcacagg tgcaagcact tgtgcagata ccaatgtaga   1680
cacctgtgca agcacttgtg cagataccaa tgtagacacc tgtgcaagca cttgtgcaga   1740
taccaatgta gacacctgtg caagcacttg tgcagatacc aatgtaaaca cttgtgcaag   1800
catgtgtgca gataccaatg tagacacctg tgcaagcacc tgtgcaaaca cctgtgcaag   1860
cacagaatac accgatttag cagatcctga gcgcatccct ttacacatca tgcaaaaaac   1920
attaaatgtg cctaatgagc ttcaggccga tattgatgca attacccaaa ccccacaggg   1980
ctatagggca gcagcccaca tattacaaaa tatagaactt catcaaagca ttaaacatat   2040
gcttgaaaat ccgagggcgt ttaaacccat tctctttaac acaaaaatta ctagatatct   2100
ttcgcagcat attccacctc aggatacttt ctataagtgg aattattaca ttgaggataa   2160
ttacgaagag ttgcgggccg ctacggaaag catctaccca gaaaagcccg acctagagtt   2220
tgccttcatt atttatgatg tggtggatag cagcaaccaa caaaaggttg atgaattta    2280
ttataaatat aaagaccaga ttttctcaga ggtttcatcc attcaattag caactggac    2340
actcctggga agctttaagg ccaacagaga gcgctacaat tattttaatc aaaataatga   2400
aataataaaa cggattttgg accgtcatga ggaagaccta agataggaa agagattct     2460
acgaaatacc atttaccaca aaaagcaaa aatatacaa gaaccggcc cggatgctcc      2520
ggggctctcc atctataatt caaccttca cacggatagc gggattaagg gactgctttc    2580
ctttaaggag ctaaaaaacc tagaaaaagc atctggaaat atcaaaaaag ctcgagagta   2640
tgattttata gacgactgcg aagaaaaaat taagcaactg cttagtaaag aaaatttaac   2700
```

```
cccgatgaa gaaagcgagc tgataaaaac aaaaaaacag ttaaataatg cgcttgaaat    2760
gctcaatgtg cctgatgata cgatacgggt agatatgtgg gtcaacaata ataataaact    2820
cgaaaaagaa attttatata caaaagcaga attggactac aaggaccacg acggtgacta    2880
caaggaccac gacatcgact acaaggacga cgacgcacaag tgattttat aaatttttt     2940 tatgagtatt tttacaaaaa tgtataaagt gtatgtctta tgtatattta taaaaatgct    3000
aaatatgcga tgtatctatg ttatttctcc gtgataggta tcgatgaagg acagttcttt    3060
ccagacattg ttgaattctg tgagcgtatg gcaaacgaat ttaaat                   3106
```

<210> SEQ ID NO 37  
<211> LENGTH: 3309  
<212> TYPE: DNA  
<213> ORGANISM: Artificial Sequence  
<220> FEATURE:  
<223> OTHER INFORMATION: MVA-p54+EP402R+K205R nucleic acid sequences

<400> SEQUENCE: 37

```
atttaaatat ggacgcatga taagaataat tttgaagcat tggaagcaac taaactatgt     60
gatgtcttgg aatcaattac agataaaaat agaaactata atcatataat agtgtaggtt    120
ggtagtattg ctcttgtgac tagagacttt agttaaggta ctgtaaaaat agaaactata    180
atcatataat agtgtaggtt ggtagtaggg tactcgtgat taattttatt gttaaacttg    240
tccttaagtc ttgccaccat ggattctgaa ttttttcaac cggtttatcc gcggcattat    300
ggtgagtgtt tgtcaccagt caccccacca agcttcttct ccacacatat gtatactatt    360
ctcattgcta tcgtggtctt agtcattatt atcatcgttc taatctatct attctcttca    420
agaaagaaaa aagctgctgc cgctattgag gaggaagata tacagtttat aaatccttat    480
caagatcagc aatgggcaga agtcactcca caaccaggta cctctaaacc ggctggagcg    540
actacagcaa gtgcaggcaa accagtcacg ggcagaccgg caacaaacag accagcaaca    600
aacaaaccag tcacggacaa cccagttacg gacagactag tcatggcaac tggcgggcca    660
gcggccgcac ctgcggccgc gagtgctcat ccgactgagc cttacacgac agtcactact    720
cagaacactg cttcacaaac aatgtcggct attgaaaatt tacgacaaag aaacacctat    780
acgcataaag acctagaaaa ctccttggac tacaaggacg atgacgacaa gtagtaggtt    840
tttatataaa aaggcgcgcc ataaaaattt ttatactagt gtaccgcggt cgaatcgatt    900
taattaacga tgctagcatt gtcgacggtg gtggcgcggc cgcctcgaga aaaattgaaa    960
ataaatacaa aggttcttga gggttgtgtt aaattgaaag cgagaaataa tcataaataa    1020
gccaccaccg tttgccacca tgtgtttaaa aatagtttta aacaatatta taatatggag    1080
tactttaaat caaactgtat ttttaaataa tattttttaca attaatgata catatggtgg    1140
tctattttgg aatacatatt atgataataa tcgtagtaat tttacttatt gtggaatagc    1200
aggaaattat tgttcatgtt gtggtcataa catatcattg tataatacaa caaataattg    1260
tagtttaatt attttttccta acaatacaga aatatttaat agaacatatg aattagtata    1320
tttggacaaa aaaattaatt atacagtaaa actattaaaa tctgttgatt ccccaactat    1380
tacatataat tgtactaatt ctttaataac atgtaaaaat aataatggga caaatgttaa    1440
tatatattta attattaaca atacaattgt taatgatact aatggagata tccttaatta    1500
ttattggaat ggtaataata attttacagc tacatgtatg attaataata caattagttc    1560
attgaatgaa acagaaaata taaattgtac taatccaata ttaaaatatc aaaattattt    1620
```

-continued

| | |
|---|---|
| atccacatta ttttatatca taatatttat tgtgagtgga ttaataatag gtatatttat | 1680 |
| ttcaatcata tctgtattat ctatacgaag aaaaagaaaa aaacatgttg aagaaataga | 1740 |
| aagtccacca ccctctgaat ctaatgaaga agatatttct cacgatgaca ccacttccat | 1800 |
| acatgaacca tctcccagag aaccattact tcctaagcct tacagtcgtt atcagtataa | 1860 |
| tacacctatt tactacatgc gtccctcaac acaaccactc aacccatttc ccctacctaa | 1920 |
| accatgcccg ccacctaaac catgtcctcc acccaagcca tgcccgccac ccaaaccatg | 1980 |
| tcctccacct aaaccgtgtt ctccacccaa accgtgtcgt ccacctaaac catgtcctcc | 2040 |
| acctaaacca tgtcctccac ctaaaccatg tcctccacct aaaccatgtc ctccatccaa | 2100 |
| accatgtcct tcacctgaat cctattctcc acccaaacca ctacctagta tcccgttact | 2160 |
| acccaatatc ccgccattat ctacacaaaa tatttcgctt attcatgtag atagaattat | 2220 |
| tgactacaaa gaccatgacg gtgattataa agatcatgac atcgactaca aggatgacga | 2280 |
| tgacaagtag ttttttataaa ttttttttat gagtattttt acaaaaatgt ataaagtgta | 2340 |
| tgtcttatgt atatttataa aaatgctaaa tatgcgatgt atctatgtta ttttattttt | 2400 |
| tttttttgga atataaatat ccggtaaaat tgaaaaaata tacactaatt agcgtctcgt | 2460 |
| ttcagacgct agctcgaggc caccatggtt gagccacgcg aacagttttt tcaagacctg | 2520 |
| ctttcagcag tggatcaaca aatggacact gtaaaaaatg acataaaaga catcatgaaa | 2580 |
| gaaaaaacat ctttttatggt gtcattcgaa actttatag aacgttacga taccatggaa | 2640 |
| aaaaatattc aagaccttca gaataagtac gaagaaatgg cggccaacct tatgaccgtc | 2700 |
| atgacggata caaaaattca gcttggagcc attatcgccc aacttgagat tctgatgata | 2760 |
| aatggcactc cacttccggc aaaaaaaaca acgattaagg aggctatgcc cctaccttca | 2820 |
| tcaaacacga acaatgatca aacgagtcct cccgcctcag gcaaaacaag tgaaacacct | 2880 |
| aaaaaaaatc ccacgaatgc aatgttcttc acgcgtagcg aatgggcatc ctcgaaaact | 2940 |
| tttcgagaaa agttttttaac accagaaatt caggccatat tggatgagca gtttgcaaac | 3000 |
| aagaccggga tcgaaagatt gcatgccgag ggtctttaca tgtggagaac ccaattctct | 3060 |
| gacgaacaga agaaaatggt caaagagatg atgaagaagg attacaagga cgatgacgat | 3120 |
| aagtagattg ttgcaaatat acagaaatag aaatattaat ttttatacta caatggacaa | 3180 |
| cattatgtcg gccgagtatt atctatctct ttatgccaaa tataattttc tccgtgatag | 3240 |
| gtatcgatga aggacagttc tttccagaca ttgttgaatt ctgtgagcgt atggcaaacg | 3300 |
| aatttaaat | 3309 |

<210> SEQ ID NO 38
<211> LENGTH: 2992
<212> TYPE: DNA
<213> ORGANISM: Artificial Sequence
<220> FEATURE:
<223> OTHER INFORMATION: MVA-p72+A104R nucleic acid sequences

<400> SEQUENCE: 38

| | |
|---|---|
| atttaaatat ggacgcatga taagaataat tttgaagcat tggaagcaac taaactatgt | 60 |
| gatgtcttgg aatcaattac agataaaaat agaaactata atcatataat agtgtaggtt | 120 |
| ggtagtattg ctcttgtgac tagagacttt agttaaggta ctgtaaaaat agaaactata | 180 |
| atcatataat agtgtaggtt ggtagtaggg tactcgtgat taattttatt gttaaacttg | 240 |
| tccttaagtc ttgccaccat ggcatcagga ggagcttttct gtcttattgc taacgatggg | 300 |
| aaggccgaca agattatatt ggcccaagac ttgcttaata gcaggatttc taacattaaa | 360 |

```
aatgtgaaca aaagttatgg gaaacccgac cccgaaccca ctttgagtca aatcgaagaa    420
acacatttgg ttcattttaa tgcgcatttt aagccttatg ttccagtagg gtttgaatac    480
aataaagtac gcccgcatac gggtaccccc accttgggaa acaagcttac ctttggtatt    540
ccccagtacg gagacttttt ccatgatatg gtgggccacc atatattggg tgcatgtcat    600
tcgtcctggc aggatgctcc gattcagggc acggcccaga tgggggccca tggtcagctt    660
caaacgtttc ctcgcaacgg atatgactgg gacaaccaaa caccttaga gggcgccgtt    720
tacacgcttg tagatccctt tggaagacct attgtacccg cacaaagaa tgcgtaccga    780
aacttggttt actactgcga ataccccgga gaacgacttt atgaaaacgt aagattcgat    840
gtaaatggaa attccctgga cgaatatagt tcggatgtca caacgcttgt gcgcaaattt    900
tgcatcccag gggataaaat gactggatat aagcacttgg tcggccagga ggtatcggtg    960
gagggaacta gtggccctct cctatgcaac attcatgatt tgcacaagcc gcaccaaagc   1020
aaacctattc ttaccgatga aaatgatacg cagcgaacgt gcagccatac caacccgaaa   1080
ttcctttcac aacattttcc cgagaactct cacaatatcc aaacagcagg taaacaagat   1140
attactccta ttacggacgc aacgtatctg gacataagac gtaatgttca ttacagctgt   1200
aatggacctc aaaccctaa atactatcag cccctcttg cgctctggat taagctgcgc   1260
ttttggttta acgagaacgt gaaccttgct attccctcgg tatccattcc cttcggcgag   1320
cgctttatca ccataaagct tgcatcgcaa aaggatttgg tgaatgaatt cctggactc   1380
tttatacgcc agtcgcgttt tatacctgga cgccccagta gacgcaatat acgctttaaa   1440
ccatggttta tcccaggagt cattaatgaa atctcgctca cgaataatga actttacatc   1500
aataacctgt tgtaacccc tgaaatacac aacctgtttg taaaacgcgt tcgatttcc   1560
ctgatacgtg tccataaaac gcaggtgacc cacaccaaca ataaccacca cgatgaaaaa   1620
ctaatgtctg ctcttaaatg gcccattgaa tatatgttta taggattaaa acctacctgg   1680
aacatctccg atcaaaatcc tcatcaacac cgagattggc acaagttcgg acatgttgtt   1740
aacgccatta tgcagcctac tcaccacgca gagataagct ttcaggatag agatacagct   1800
cttccagacg catgttcatc tatatcggat attagccccg ttacgtatcc gatcacatta   1860
cctattatta aaaacatttc cgtaactgct catggtatca atcttatcga taagtttcca   1920
tcaaagttct gcagctctta catacccttc cactacggag gcaatgcaat taaaacccc   1980
gatgatccgg gtgcgatgat gattacctt gctttgaagc cacgggagga ataccaaccc   2040
agtggtcata ttaacgtatc cagagcaaga gaatttttata ttagttggga cacggattac   2100
gtggggtcta tcactacggc tgatcttgtg gtatcggcat ctgctattaa ctttcttctt   2160
cttcagaacg gttcagctgt gctgcgttac agtaccgact acaaagacca tgacggtgat   2220
tataaagatc atgacatcga ctacaaggat gacgatgaca agtagtaggt ttttatataa   2280
aaaggcgcgc cataaaaatt tttatactag tgtaccgcgg tcgaatcgat ttaattaacg   2340
atgctagcat tgtcgacggt ggtggcgcgg ccgcctcgag aaaaattgaa aataaataca   2400
aaggttcttg agggttgtgt taaattgaaa gcgagaaata atcataaata agccaccacc   2460
gtttgccacc atgtcgacaa aaaaaaagcc cacaattacc aagcaagagc tttactcctt   2520
agtagcggca gatacccagt taaataaagc attgattgaa agaatcttta caagccagca   2580
aaaaataatc caaatgcttt aaagcacaa tcaagaagtt attataccac ccggaatcaa   2640
gttcaccgtc gttacagtga aagctaaacc tgctcgccag ggccataacc ccgcaacagg   2700
```

```
agagcctatt caaattaaag ccaagcctga acataaagcc gtaaagatac gagcattgaa    2760
acctgttcat gatatgttaa atgactacaa ggatgacgat gacaagtagt ttttataaat    2820 ttttttatg agtattttta caaaaatgta taaagtgtat gtcttatgta tatttataaa     2880
aatgctaaat atgcgatgta tctatgttat ttctccgtga taggtatcga tgaaggacag    2940
ttctttccag acattgttga attctgtgag cgtatggcaa acgaatttaa at            2992
```

<210> SEQ ID NO 39
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 39

His His His His His His
1               5

What is claimed is:

1. A vaccine comprising an effective immunizing amount of a recombinant nucleic acid molecule, comprising an expression cassette encoding a polyepitope comprising T-cell antigens from proteins of African Swine Fever Virus comprising 2-50 nonapeptides as T-cell antigens selected from SEQ ID NOs: 2-14 and 16-21, wherein the T-cell antigens are separated by spacers that contain signals for proteasome cleavage, selected from spacer sequences ARY, NQF, RRW, AQW, and/or SEQ ID NOs: 22-28, and wherein said vaccine further comprises a viral particle comprising B-cell antigens of African Swine Fever Virus, selected from proteins p30, p54, p72, EP402R, A104R and/or B602L of African Swine Fever Virus, wherein the recombinant molecule comprises the nucleotide sequence of SEQ ID NO: 33.

2. The vaccine according to claim 1, wherein a viral particle, comprises the recombinant molecule.

3. The vaccine according to claim 2, wherein the viral particle further comprises a marker protein.

4. A method of stimulating an immune response in a pig comprising administering the vaccine according to claim 1 to the pig in an amount effective to induce an immune response.

5. The method according to claim 4, wherein the vaccine is administered parenterally.

6. The method according to claim 4, wherein the vaccine is administered 2-4 times.

7. The method according to claim 6, wherein at least one of the administrations of the vaccine is combined with administration of synthetic T-cell antigens from proteins of African Swine Fever Virus.

8. The method according to claim 6, wherein vaccine is administered with intervals of about 2 weeks.

9. A method for preventing or ameliorating infection of African Swine Fever Virus in pigs, comprising administering the vaccine according to claim 1 to at least one pig.

10. A set of viral particles comprising a viral particle comprising the recombinant molecule as defined according to claim 1, and one or more viral particles comprising B-cell antigens of African Swine Fever Virus.

11. A method of protecting a pig from subsequent infection with African Swine Fever Virus, comprising providing the pig with the set of viral particles according to claim 10.

12. A kit of parts, comprising a viral particle, comprising the recombinant molecule as defined according to claim 1 and one or more viral particles comprising B-cell antigens of African Swine Fever Virus.

13. A method of protecting a pig from subsequent infection with African Swine Fever Virus, comprising providing the pig with the kit of parts according to claim 12.

14. The vaccine of claim 1, wherein the recombinant nucleic acid molecule is a recombinant DNA molecule.

* * * * *